US010777188B2

(12) United States Patent
van Hout et al.

(10) Patent No.: US 10,777,188 B2
(45) Date of Patent: Sep. 15, 2020

(54) TIME-FREQUENCY CONVOLUTIONAL NEURAL NETWORK WITH BOTTLENECK ARCHITECTURE FOR QUERY-BY-EXAMPLE PROCESSING

(71) Applicant: SRI International, Menlo Park, CA (US)

(72) Inventors: Julien van Hout, San Francisco, CA (US); Vikramjit Mitra, Fremont, CA (US); Horacio Franco, Menlo Park, CA (US); Emre Yilmaz, Clementi (SG)

(73) Assignee: SRI International, Menlo Park, CA (US)

( * ) Notice: Subject to any disclaimer, the term of this patent is extended or adjusted under 35 U.S.C. 154(b) by 94 days.

(21) Appl. No.: 16/191,296

(22) Filed: Nov. 14, 2018

(65) Prior Publication Data

US 2020/0152179 A1    May 14, 2020

(51) Int. Cl.
| | |
|---|---|
| *G10L 15/00* | (2013.01) |
| *G10L 15/16* | (2006.01) |
| *G10L 15/22* | (2006.01) |
| *G06N 3/08* | (2006.01) |
| *G06N 3/04* | (2006.01) |
| *G06F 40/242* | (2020.01) |
| *G10L 15/08* | (2006.01) |

(52) U.S. Cl.
CPC ............ *G10L 15/16* (2013.01); *G06F 40/242* (2020.01); *G06N 3/04* (2013.01); *G06N 3/08* (2013.01); *G10L 15/22* (2013.01); *G10L 2015/088* (2013.01)

(58) Field of Classification Search
USPC .................................. 704/231–257, 270–275
See application file for complete search history.

(56) References Cited

U.S. PATENT DOCUMENTS

2018/0261213 A1* 9/2018 Arik .................... G06N 3/0445

OTHER PUBLICATIONS

Abdel-Hamid et al., "Applying Convolutional Neural Networks Concepts to Hybrid-NN-HMM Model for Speech Recognition," 2012 IEEE International Conference on Acoustics, Speech and Signal Processing (ICASSP), Mar. 2012, 4 pp.

(Continued)

*Primary Examiner* — Jesse S Pullias
(74) *Attorney, Agent, or Firm* — Shumaker & Sieffert, P.A.

(57) ABSTRACT

A computing system determines whether a reference audio signal contains a query. A time-frequency convolutional neural network (TFCNN) comprises a time and frequency convolutional layers and a series of additional layers, which include a bottleneck layer. The computation engine applies the TFCNN to samples of a query utterance at least through the bottleneck layer. A query feature vector comprises output values of the bottleneck layer generated when the computation engine applies the TFCNN to the samples of the query utterance. The computation engine also applies the TFCNN to samples of the reference audio signal at least through the bottleneck layer. A reference feature vector comprises output values of the bottleneck layer generated when the computation engine applies the TFCNN to the samples of the reference audio signal. The computation engine determines at least one detection score based on the query feature vector and the reference feature vector.

20 Claims, 7 Drawing Sheets

(56) References Cited

OTHER PUBLICATIONS

Abdel-Hamid et al., "Convolutional Neural Networks for Speech Recognition," IEEE/ACM Transactions on Audio, Speech and Language Processing, vol. 22, No. 10, Oct. 2014, 13 pp.
Anguera et al., "Memory Efficient Subsequence DTW for Query-By-Example Spoken Term Detection," 2013 IEEE International Conference on Multimedia and Expo (ICME), Jul. 2013, 6 pp.
Anguera et al., "Query by Example Search on Speech at Mediaeval 2014," MediaEval 2014 Workshop, Oct. 2014, 2 pp.
Anguera et al., "QUESST2014: Evaluating Query-By-Example Speech Search in a Zero-Resource Selling with Real-Life Queries," 2015 IEEE International Conference on Acoustics, Speech and Signal Processing (ICASSP), Apr. 2015, 5 pp.
Bartels et al., "Toward Human-Assisted Lexical Unit Discovery Without Text Resources," 2016 IEEE Spoken Language Technology Workshop (SLT), Dec. 2016, 7 pp.
Ganapathy et al., "Robust Language Identification Using Convolutional Neural Network Features," INTERSPEECH 2014, Sep. 2014, 5 pp.
Gemmeke et al., "Artificial and Online Acquired Noise Dictionaries for Noise Robust ASR," Proceedings of the 11th Annual Conference of the International Speech Communication Association, Sep. 2010, 4 pp.
Gemmeke et al., "Exemplar-Based Sparse Representations for Noise Robust Automatic Speech Recognition," IEEE Transactions on Audio, Speech, and Language Processing, vol. 19, No. 7, Sep. 2011, 14 pp.
Gemmeke et al., "Noise Robust Exemplar-Based Connected Digit Recognition, 2010 IEEE International Conference on Acoustics, Speech and Signal Processing," Mar. 2010, 4 pp.
Godfrey et al., "Air Traffic Control Complete LDC94S14A," Web Download, Philadelphia: Linguistic Data Consortium, 1994, 2 pp. (Applicant points out, in accordance with MPEP 609.04(a), that the year of publication, 1994, is sufficiently earlier than the effective U.S. filing date, so that the particular month of publication is not in issue.).
Grezl et al., "Hierarchical Neural Net Architectures for Feature Extraction in ASR," 11th Annual Conference of the International Speech Communication Association, INTERSPEECH 2010, Sep. 2010, 4 pp.
Hazen et al., "Query-By-Example Spoken Term Detection Using Phonetic Posteriorgram Templates," 2009 IEEE Workshop on Automatic Speech Recognition and Understanding, Nov. 2009, 6 pp.
Hou et al., "The NNI Query-by-Example System for MediaEval 2015," MediaEval 2015 Workshop, Sep. 2015, 3 pp.
Hoyer et al., "Non-Negative Matrix Factorization with Sparseness Constraints," Journal of Machine Learning Research, vol. 5, Nov. 2004, 13 pp.
Hurmalainen et al., "Non-Negative Matrix Deconvolution in Noise Robust Speech Recognition," 2011 IEEE International Conference on Acoustics, Speech ad Signal Processing (ICASSP), May 2011, 4 pp.
Mitra et al., "Evaluating Robust Features on Deep Neural Networks for Speech Recognition in Noisy and Channel Mismatched Conditions," INTERSPEECH 2014, Sep. 2014, 5 pp.
Mitra et al., "Fusion Strategies for Robust Speech Recognition and Keyword Spotting for Channel- and Noise-Degraded Speech," INTERSPEECH 2016, Sep. 2016, 5 pp.
Mitra et al., "Speech Recognition in Unseen and Noisy Channel Conditions," 2017 IEEE International Conference on Acoustics, Speech and Signal Processing (ICASSP), Mar. 2017, 5 pp.
Mitra et al., "Time-Frequency Convolutional Networks for Robust Speech Recognition," 2015 IEEE Workshop on Automatic Speech Recognition and Understanding (ACRU), Dec. 2015, 7 pp.
Proenca et al., "Query by Example Search with Segmented Dynamic Time Warping for Non-Exact Spoken Queries," 2015 23rd European Signal Processing Conference (EUSIPCO), Aug. 2015, 5 pp.
Qi et al., "Bottleneck Features Based on Gammatone Frequency Cepstral Coefficients," INTERSPEECH 2013, Aug. 2013, 5 pp.
Ram et al., "Subspace Detection of DNN Posterior Probabilities via Sparse Representation for Query by Example Spoken Term Detection," INTERSPEECH 2016, Sep. 2016, 5 pp.
Rodriquez et al., "High-Performance Query-By-Example Spoken Term Detection on the SWS 2013 Evaluation," 2014 IEEE International Conference on Acoustics, Speech and Signal Processing (ICASSP), May 2014, 5 pp.
Sainath et al., "Deep Convolutional Neural Networks for LVCSR," 2013 IEEE International Conference on Acoustics, Speech ad Signal Processing, May 2013, 5 pp.
Sainath et al., "Sparse Representation Features for Speech Recognition," INTERSPEECH 2010, Sep. 2010, 4 pp.
Szoke et al., "BUT QUESST 2014 System Description," MediaEval 2014 Workshop, Oct. 2014, 2 pp.
Szoke et al., "Coping with Channel Mismatch in Query-by-Example—But QUESST 2014," 2015 IEEE International Conference on Acoustics, Speech and Signal Processing (ICASSP), Apr. 2015, 5 pp.
Tan et al., "Novel Variations of Group Sparse Regularization Techniques With Applications to Noise Robust Automatic Speech Recognition," IEEE Transactions on Audio, Speech, and Language Processing, vol. 20, No. 4, May 2012, 10 pp.
Van Hout et al., "Recent Improvements in SRI's Keyword Detection System for Noisy Audio," INTERSPEECH 2014, Sep. 2014, 5 pp.
Van Hout et al., "Tackling Unseen Acoustic Conditions in Query-by-Example Search Using Time and Frequency Convolution for Multilingual Deep Bottleneck Features", 2017 IEEE Automatic Speech Recognition and Understanding Workshop (ASRU), Dec. 2017, 7 pp.
Van Hout, "Improving Keyword Spotting on Unseen Data Using Query-by-Example Techniques," SRI International, Aug. 3, 2017, 2 pp.
Vesely et al., "Convolutive Bottleneck Network Features for LVCSR," 2011 IEEE Workshop on Automatic Speech Recognition and Understanding, Dec. 2011, 6 pp.
Vesely et al., "The Language-Independent Bottleneck Features," 2012 IEEE Spoken Language Technology Workshop (SLT), Dec. 2012, 6 pp.
Virtanen et al., "Monaural Sound Source Separation by Nonnegative Matrix Factorization With Temporal Continuity and Sparseness Criteria," IEEE Transactions on Audio, Speech, and Language Processing, vol. 15, No. 3, Mar. 2007, 9 pp.
Xu et al., "Language Independent Query-By-Example Spoken Term Detection Using N-Best Phone Sequences and Partial Matching," 2015 IEEE International Conference on Acoustics, Speech and Signal Processing (ICASSP), Apr. 2015, 5 pp.
Yilmaz et al., "Noise Robust Exemplar Matching Using Sparse Representations of Speech," IEEE/ACM Transactions on Audio, Speech, and Language Processing, vol. 22, No. 8, Aug. 2014, 14 pp.
Yilmaz et al., "Noise-Robust Digit Recognition with Exemplar-Based Sparse Representations of Variable Length," 2012 IEEE International Workshop on Machine Learning for Signal Processing, Sep. 2012, 4 pp.
Yilmaz et al., "Noise-Robust Exemplar Matching for Rescoring Query-by-Example Search," 2017 IEEE Automatic Speech Recognition and Understanding Workshop (ASRU), Dec. 2017, 7 pp.
Zhang et al., "Unsupervised Spoken Keyword Spotting via Segmental DTW on Gaussian Posteriorgrams," 2009 IEEE Workshop on Automatic Speech Recognition and Understanding, Dec. 2009, 6 pp.
Muller, "Information Retrieval for Music and Motion," Springer-Verlag Berlin Heidelberg 2007, 319 pp. (Applicant points out, in accordance with MPEP 609.4(a), that the year of publication, 2007, is sufficiently earlier than the effective U.S. filing date, so that the particular month of publication is not in issue).

* cited by examiner

US 10,777,188 B2

TIME-FREQUENCY CONVOLUTIONAL NEURAL NETWORK WITH BOTTLENECK ARCHITECTURE FOR QUERY-BY-EXAMPLE PROCESSING

GOVERNMENT RIGHTS

This invention was made with Government support under contract no. HR0011-15-C-0037 awarded by the Defense Advanced Research Projects Agency and under grant numbers IIS-1162046 and BCS-1453831 awarded by the National Science Foundation. The Government has certain rights in this invention.

TECHNICAL FIELD

This disclosure generally relates to machine learning systems.

BACKGROUND

Machine learning algorithms have recently made rapid progress using deep neural networks (DNNs). DNNs are artificial neural networks that have multiple hidden layers between input and output layers. Example types of DNNs include recurrent neural networks (RNNs) and convolutional neural networks (CNNs). DNNs have broad application in the fields of artificial intelligence, computer vision, automatic speech recognition, language translation, and so on. Training times, memory requirements, and energy efficiency remain challenges associated with DNNs. Moreover, different DNN architectures are more efficient for different tasks. For example, CNNs may be more efficient than other types of DNNs for image recognition while RNNs may be more efficient than CNNs for natural language translation.

Searching recorded audio for instances of a keyword is a time-consuming activity for humans. For instance, it may take hours for a person to listen to recorded audio to find a part of the recorded audio that the person was looking for. To date, machine learning algorithms to perform this activity have met with significant challenges.

SUMMARY

In general, the disclosure describes techniques related to determining whether a reference audio signal contains a query utterance. In one example, this disclosure describes a computing system for determining whether a reference audio signal contains a query, the computing system comprising: a computer-readable storage medium configured to: store samples of the reference audio signal, each of the samples of the reference audio signal corresponding to a different combination of a time band and a frequency band; and store data representing a time-frequency convolutional neural network (TFCNN), the TFCNN comprising: a time convolutional layer that applies first filters to first input feature vectors, the first input feature vectors being sets of the samples that correspond to a same frequency band and different time bands; a frequency convolutional layer that applies second filters to second input feature vectors, the second input feature vectors being sets of the samples that correspond to a same time band and different frequency bands; and a series of additional layers, wherein: the series of additional layers includes an input layer, an output layer, and a series of hidden layers between the input layer and the output layer, input to the input layer comprises output of the time convolutional layer and output of the frequency convolutional layer, and the series of hidden layers includes a bottleneck layer that includes fewer neurons than a hidden layer that precedes the bottleneck layer in the series of hidden layers; wherein a computation engine comprises circuitry configured to apply the TFCNN to samples of a query utterance at least through the bottleneck layer, the TFCNN is trained to discriminate phonetic classes, and wherein a query feature vector comprises output values of the bottleneck layer generated when the computation engine applies the TFCNN to the samples of the query utterance, the query utterance being an example of an audio signal that contains the query; wherein the computation engine comprises circuitry configured to apply the TFCNN to the samples of the reference audio signal at least through the bottleneck layer, wherein a reference feature vector comprises output values of the bottleneck layer generated when the computation engine applies the TFCNN to the samples of the reference audio signal; and wherein the computation engine comprises circuitry configured to determine, based on the query feature vector and the reference feature vector, at least one detection score corresponding to a level of confidence that the reference audio signal contains the query.

In another example, this disclosure describes a method for determining whether a reference audio signal contains a query, the method comprising: storing samples of the reference audio signal, each of the samples of the reference audio signal corresponding to a different combination of a time band and a frequency band; and storing data representing a time-frequency convolutional neural network (TFCNN), the TFCNN comprising: a time convolutional layer that applies first filters to first input feature vectors, the first input feature vectors being sets of the samples that correspond to a same frequency and different times; a frequency convolutional layer that applies second filters to second input feature vectors, the second input feature vectors being sets of the samples that correspond to a same time and different frequencies; and a series of additional layers, wherein: the series of additional layers including an input layer, an output layer, and a series of hidden layers between the input layer and the output layer, input to the input layer comprises output of the time convolutional layer and output of the frequency convolutional layer, the series of hidden layers includes a bottleneck layer that includes fewer neurons than a hidden layer that precedes the bottleneck layer in the series of hidden layers; applying the TFCNN to samples of a query utterance at least through the bottleneck layer, wherein the TFCNN is trained to discriminate phonetic classes and a query feature vector comprises output values of the bottleneck layer generated when the computation engine applies the TFCNN to the samples of the query utterance, the query utterance being an example of an audio signal that contains the query; applying the TFCNN to samples of the reference audio signal at least through the bottleneck layer, wherein a reference feature vector comprises output values of the bottleneck layer generated when the computation engine applies the TFCNN to the samples of the reference audio signal; and determining, based on the query feature vector and the reference feature vector, at least one detection score corresponding to a level of confidence that the reference audio signal contains the query.

In another example, this disclosure describes a non-transitory computer-readable data storage medium having instructions stored thereon that, when executed, cause a computing system to: store samples of the reference audio signal, each of the samples of the reference audio signal corresponding to a different combination of a time band and a frequency band; and store data representing a time-frequency convolutional neural network (TFCNN), the TFCNN comprising: a time convolutional layer that applies first filters to first input feature vectors, the first input feature vectors being sets of the samples that correspond to a same frequency band and different time bands; a frequency convolutional layer that applies second filters to second input feature vectors, the second input feature vectors being sets of the samples that correspond to a same time band and different frequency bands; and a series of additional layers, wherein: the series of additional layers including an input layer, an output layer, and a series of hidden layers between the input layer and the output layer, input to the input layer comprises output of the time convolutional layer and output of the frequency convolutional layer, the series of hidden layers includes a bottleneck layer that includes fewer neurons than a hidden layer that precedes the bottleneck layer in the series of hidden layers; apply the TFCNN to samples of a query utterance at least through the bottleneck layer, wherein the TFCNN is trained to discriminate phonetic classes and a query feature vector comprises output values of the bottleneck layer generated when the computation engine applies the TFCNN to the samples of the query utterance, the query utterance being an example of an audio signal that contains the query; apply the TFCNN to the samples of the reference audio signal at least through the bottleneck layer, wherein a reference feature vector comprises output values of the bottleneck layer generated when the computation engine applies the TFCNN to the samples of the reference audio signal; and determine, based on the query feature vector and the reference feature vector, a detection score corresponding to a level of confidence that the reference audio signal contains the query.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
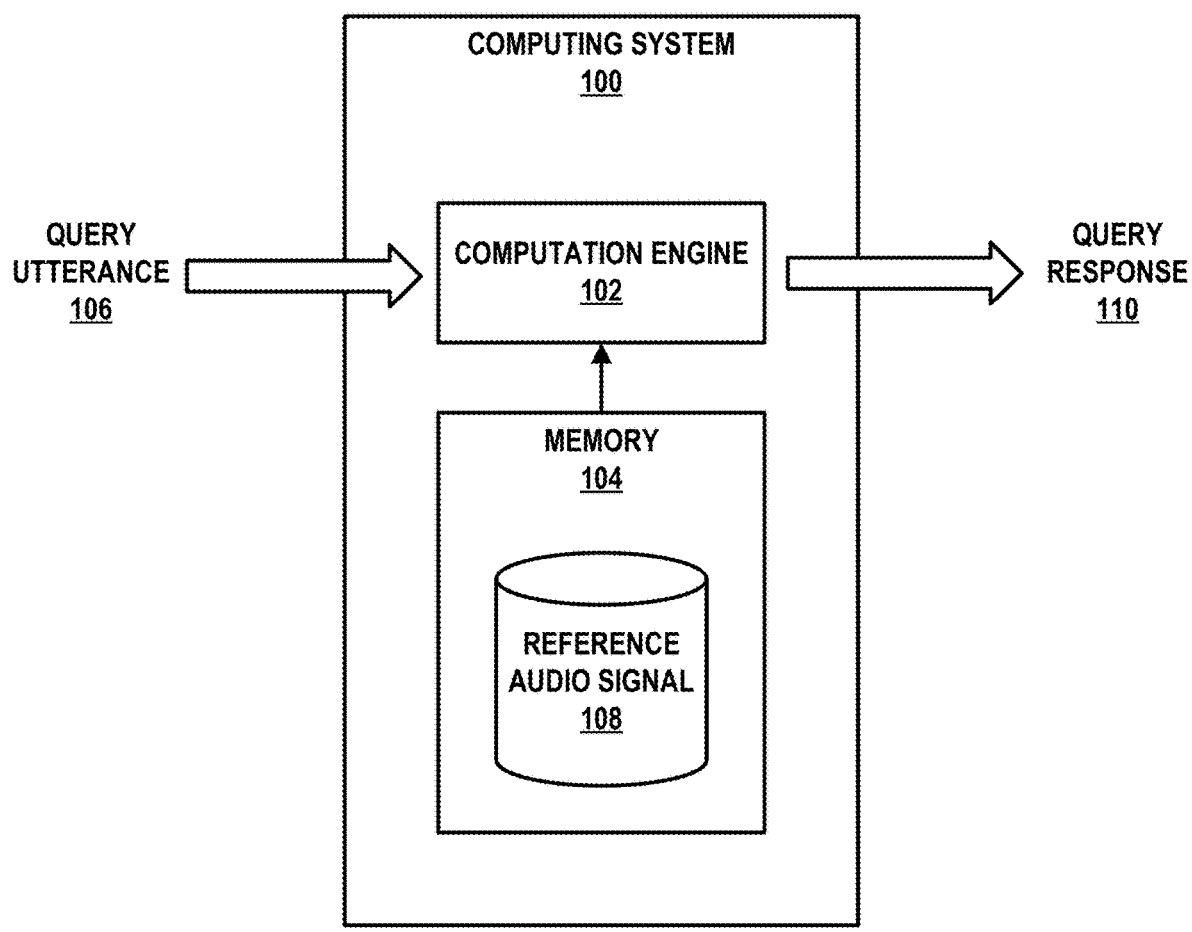
FIG. 1 is a block diagram illustrating an example computing system implemented in accordance with a technique of the disclosure.

A computing system may be configured to determine whether a reference audio signal, or audio frame thereof, contains sounds sufficiently similar to sounds represented by samples of a query utterance. For example, a computing system may be configured to perform keyword spotting. Keyword spotting (KWS) is a process of determining whether a reference audio signal contains sounds representing a keyword represented in a query utterance. For example, a student may record history lectures from classes given by a professor. In this example, the student may want to find the parts of the lectures relating to a specific concept, such as the Battle of Agincourt. Accordingly, in this example, the student may speak the word "Agincourt" into a microphone and provide the recording of the word "Agincourt" to the computing system. The computing system may then use the student's recording of the word "Agincourt" to find places in the recordings of the lectures that mention the word "Agincourt." In this example, the recordings of the professor's voice may be considered "reference audio signals" and the recording of the student's voice may be considered a "query utterance." The challenge in finding the places in the recordings of the lectures that mention the word "Agincourt" is complicated by the fact that the sound of the professor saying the word "Agincourt" is not the same each time the professor says it and the sound of the student saying the word "Agincourt" is different from any of the sounds that the professor makes when saying the word "Agincourt."

Traditional keyword spotting systems have relied on building a speech recognition system that detects words, phones or other acoustic units. In data-rich applications, a strong Automatic Speech Recognition (ASR) system generates high-quality word lattices that can be searched for sequences of words of interest. For instance, to perform keyword spotting, a computing system may convert speech sounds into text and then perform a conventional textual comparison to determine whether the speech sounds included a keyword. ASR systems typically rely on linguistic data to help determine whether a sound corresponds to a particular word. For instance, when determining whether a sound corresponds to word X or word Y, an ASR system may use linguistic data indicating that word X is more likely to occur in a particular language than word Y when preceded by word Z. When less linguistic data is available, one can use a phone recognizer or syllable recognizer to infer lattices that can be searched for keyword hits. In both cases, out-of-vocabulary words can be dealt with by using automatically inferred pronunciations and approximate search, but some loss in accuracy is expected. Rapid development of a portable and usable keyword spotting systems in a new language, dialect, or domain remains a difficult challenge, because training such a system in a way that is usable in potentially channel mismatched and noisy data is heavily reliant on annotations.

When a computing system performs Query by Example (QbE) processing, the computing system may query a database that contains data items by providing an example of a desired type of data item. In other words, QbE may be considered to be equivalent to a request by the user for a computer to show the user data items similar to a data item provided by the user. When QbE processing is used in the context of keyword spotting, a user may provide (e.g., enroll) one or more query utterances. Each query utterance may include a different audio signal representing a keyword. The computing system may then use the query utterances to determine whether a reference audio signal includes the keyword.

QbE search has seen renewed research interest in recent years for keyword spotting due to the potential of QbE search to perform well without necessarily relying on an ASR system. For instance, when using QbE search, it may not be necessary to convert audio signals into text and then perform a textual comparison. In fact, some QbE systems can function in a fully language agnostic way because such QbE system do not need knowledge of the languages of interest or language-matched training data, as long as queries are defined either in isolation or in context with precise boundaries. Progress has been made in recent years thanks to an effort to make language-agnostic QbE a part of the MediaEval SWS/QUESST evaluations from 2013 to 2015. Work stemming from those evaluations has shown that techniques leveraging supervised, discriminatively trained tokenizers, such as dynamic time warping (DTW) and DNNs with bottleneck architectures, are among the highest-performing single systems in language-agnostic QbE in channel- and noise-degraded conditions. A DNN with a bottleneck architecture is a DNN that comprises a plurality of layers that includes one or more hidden layers, where one of the hidden layers (i.e., a bottleneck layer) includes fewer neurons than an immediately preceding layer of the DNN and an immediately following layer of the DNN.

Current bottleneck architectures that have been tried for QbE include a simple five-layer bottleneck that can be trained in a multilingual setting. Other, more complex hierarchical architectures learn a bottleneck representation in two steps by first learning a bottleneck whose outputs are then contextualized and fed to a second network that learns improved features for ASR. Such architectures have been used to train monolingual stacked bottleneck systems for QbE in recent MediaEval evaluations.

A speech data mismatch may occur when a computing system incorrectly identifies a sound as corresponding to a particular word or phrase. Noise, reverberation, and channel mismatches are the usual causes of speech data mismatches and, hence, are the common sources of performance degradation for ASR systems. A channel mismatch may occur when a reference audio signal and a query utterance are in different frequency channels. While deep neural network (DNN) models have been used in conjunction with noise-robust features to fight channel and noise mismatches, more recently a new type of model called a convolutional neural network (CNN) has been introduced that uses frequency convolution and pooling layers inspired by image recognition. CNNs have been shown to largely outperform standard DNNs in clean speech recognition tasks, and these gains were shown to carry over to channel mismatched, noisy, and reverberant speech recognition tasks. V. Mitra and H. Franco, "Time-frequency convolutional networks for robust speech recognition," in Proc. 2015 IEEE Automatic Speech Recognition and Understanding Workshop, 2015, described a time-convolution layer parallel to the frequency convolution layer as a way to capture time-scale information and to successfully improve the CNN baseline in reverberant and noisy conditions; this network architecture is referred to as the time-frequency convolutional neural network (TFCNN). CNNs have also started to be used to train noise robust bottleneck features in other tasks, such as language identification.

Some of the following embodiments describe how CNNs and TFCNNs can be used to train multilingual bottleneck features that may be channel- and noise-robust in unseen, mismatched conditions. It has been shown that some examples of this disclosure show large improvements in QbE performance over five-layer DNNs by reducing the number of parameters and keeping the network architecture very simple. Such improvements were shown on the MediaEval QUESST 2014 task where channel mismatch is a challenge, as well as in matched and mismatched noise conditions.

FIG. 1 is a block diagram illustrating example computing system 100 that is configured in accordance with a technique of this disclosure. As shown, computing system 100 comprises processing circuitry for executing a computation engine 102. Computing system 100 also comprises memory 104. In some examples, the processing circuitry of computing system 100 includes one or more microprocessors, controllers, digital signal processors (DSPs), application specific integrated circuits (ASICs), field-programmable gate arrays (FPGAs), or equivalent discrete or integrated logic circuitry, or other types of processing circuitry. In some examples, computing system 100 comprises any suitable computing system, such as desktop computers, laptop computers, gaming consoles, smart televisions, handheld devices, tablets, mobile telephones, smartphones, etc. Furthermore, in some examples, at least a portion of system 100 is distributed across a cloud computing system, a data center, or across a network, such as the Internet, another public or private communications network, for instance, broadband, cellular, Wi-Fi, and/or other types of communication networks, for transmitting data between computing systems, servers, and computing devices.

In some examples, computing system 100 is implemented in circuitry, such as via one or more processors and memory 104. Furthermore, computation engine 102 may comprise circuitry, such as one or more processors. Memory 104 may comprise one or more storage devices or other types of non-transitory computer-readable storage media. One or more components of computing system 100 (e.g., processors, memory 104, etc.) may be interconnected to enable inter-component communications (physically, communicatively, and/or operatively). In some examples, such connectivity may be provided by a system bus, a network connection, an inter-process communication data structure, local area network, wide area network, or any other method for communicating data. The one or more processors of computing system 100 may implement functionality and/or execute instructions associated with computing system 100. Examples of processors include microprocessors, application processors, display controllers, auxiliary processors, one or more sensor hubs, and any other hardware configured to function as a processor, a processing unit, or a processing device. Computing system 100 may use one or more processors to perform operations (e.g., operations of computation engine 102) in accordance with one or more aspects of the present disclosure using software, hardware, firmware, or a mixture of hardware, software, and firmware residing in and/or executing at computation engine 102 and/or computing system 100. The one or more storage devices of memory 104 may be distributed among multiple devices.

Memory 104 may be operatively coupled to computation engine 102 and may store information for processing during operation of computing system 100. In some examples, memory 104 comprises temporary memories, meaning that a primary purpose of the one or more storage devices of memory 104 is not long-term storage. Memory 104 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 104, in some examples, also includes one or more computer-readable storage media. Memory 104 may be configured to store larger amounts of information than volatile memory. Memory 104 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories. Memory 104 may store program instructions and/or data associated with one or more of the modules described in accordance with one or more aspects of this disclosure. As shown in the example of FIG. 1, memory 104 may store a reference audio signal 108, a query utterance 106, hyperparameters 212, weights 210, a reference feature vector 208, a query feature vector 206, training data 214, an output feature vector 124, a joint distance matrix 126, and/or other data.

Computation engine 102 and memory 104 may provide an operating environment or platform for one or more modules or units, which may be implemented as software, but may in some examples include any combination of hardware, firmware, and software. Computation engine 102 may execute instructions and memory 104 may store instructions and/or data of one or more modules. The combination of computation engine 102 and memory 104 may retrieve, store, and/or execute the instructions and/or data of one or more applications, modules, or software. Computation engine 102 and/or memory 104 may also be operably coupled to one or more other software and/or hardware components, including, but not limited to, one or more of the components illustrated in FIG. 1 and other figures of this disclosure. Execution of such instructions may cause computing system 100 to perform the operations of computation engine 102.

Computation engine 102 may receive a query utterance 106. Query utterance 106 may include a digital audio signal. Query utterance 106 may be an example of an audio signal that contains a query posed to computing system 100. Computation engine 102 may receive query utterance 106 in any of various ways. For example, computation engine 102 may receive query utterance 106 from a microphone or other source of digital audio signals. Computation engine 102 may determine whether a reference audio signal 108 contains the query. Reference audio signal 108 may contain the query if reference audio signal 108 contains one or more instances of the query utterance. In some examples, an audio frame may be considered to contain the query if an instance of the query utterance starts in the audio frame. In some examples, a segment of reference audio signal 108 may be considered to contain the query if the segment of reference audio signal 108 contains an instance of the query utterance. Thus, multiple segments or audio frames of the same reference audio signal 108 may be said to contain the query.

Computation engine 102 may output a query response 110 that is based on whether reference audio signal 108 contains the query. In various examples, query response 110 may include different types of data and computation engine 102 may output query response 110 in different ways. For example, computation engine 102 may output a message indicating audio frames of reference audio signal 108 that contain the query.

Figure 2:
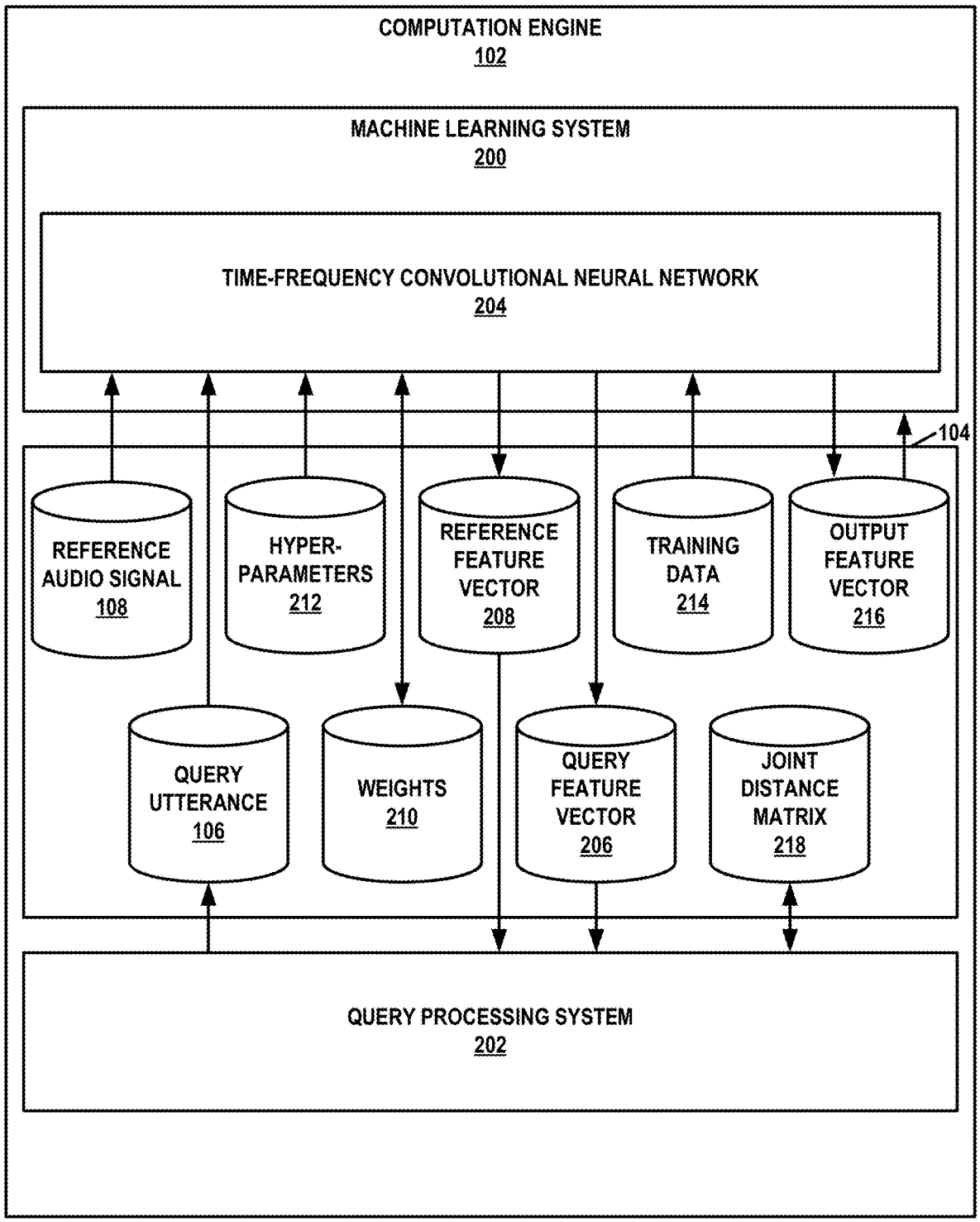
FIG. 2 is a block diagram illustrating example details of a computation engine.

FIG. 2 is a block diagram illustrating example details of computation engine 102. In the example of FIG. 2, computation engine 102 includes a machine learning system 200 and a query processing system 202. As shown in the example of FIG. 1, machine learning system 200 implements a time-frequency convolutional neural network (TFCNN) 204.

Query processing system 202 may use machine learning system 200 to perform QbE processing for keyword spotting. For instance, query processing system 202 may receive query utterance 106 and store samples of query utterance in memory 104. Query utterance 106 may include a digital audio signal. Query utterance 106 may be an example of an audio signal that contains a query posed to query processing system 202. Query processing system 202 may receive query utterance 106 in any of various ways. For example, query processing system 202 may receive query utterance 106 from a microphone or other source of digital audio signals. Query processing system 202 may provide the query utterance to machine learning system 200. In response, machine learning system 200 may generate query feature vector 206 based on query utterance 106. Additionally, query processing system 202 may obtain reference feature vector 208 from memory 104. Machine learning system 200 may generate reference feature vector 208 based on reference audio signal 108. Query processing system 202 may determine, based on query feature vector 206 and reference feature vector 208, whether reference audio signal 108 (or one or more audio frames of reference audio signal 108) contains the query. An audio frame of reference audio signal 108 may contain the query if an instance of query utterance 106 starts in the audio frame.

As noted above, machine learning system 200 implements TFCNN 204. TFCNN 204 receives input data and generates output data. TFCNN 204 has a plurality of layers. A layer may include a set of artificial neurons. The layers may include an input layer, an output layer, and a series of one or more hidden layers. The hidden layers of TFCNN include a bottleneck layer that includes fewer neurons than a hidden layer that precedes the bottleneck layer in the series of hidden layers. The layers of TFCNN 204 may include fully connected layers, convolutional layers, pooling layers, and/or other types of layers. In a fully connected layer, the output of each neuron of a previous layer forms an input of each neuron of the fully connected layer. In a convolutional layer, each neuron of the convolutional layer processes input from a data source (e.g., input data or data output by neurons of a previous layer) associated with the neuron's receptive field. Pooling layers combine the outputs of neuron clusters at one layer into a single neuron in the next layer.

Inputs of artificial neurons in a layer of TFCNN 204 may be associated with corresponding weights in weights 210. In some examples, the output of a k-th artificial neuron in TFCNN 204 is defined as:

$$y_k = \varphi\left(\sum_{j=0}^{m} w_{kj} x_j\right) \quad (1)$$

In equation (1), $y_k$ is the output of the k-th artificial neuron, $\varphi(\cdot)$ is an activation function, $w_{kj}$ is the weight of the j-th input to the k-th artificial neuron, and $x_j$ is the value of the j-th input to the k-th artificial neuron. In some examples, one or more of the inputs to the k-th artificial neuron is a bias term that is not an output value of another artificial neuron or based on source data. Various transfer functions are known in the art, such as Rectified Linear Unit (ReLU), TanH, Sigmoid, and so on. Machine learning system 200 may use a backpropagation technique to update weights 210. Hyperparameters 212 may include parameters that machine learning system 200 may use to control a learning rate of TFCNN 204 and other aspects of TFCNN 204.

Machine learning system 200 may train TFCNN 204. When TFCNN 204 is being trained, machine learning system 200 may provide training data 214 to TFCNN 204. Training data 214 may comprise a set of digital audio signals. Each digital audio signal in training data 214 may be associated with a target feature vector. The target feature vector is a vector comprising a set of values that TFCNN 204 should output for the associated digital audio signal. For example, the values in the target feature vector may correspond to different phonetic classes (e.g., phones or senones) in the sounds represented by the associated digital audio signal. When machine learning system 200 runs a forward pass of TFCNN 204 using a digital audio signal in training data 214 as input, the output layer of TFCNN 204 may generate output feature vector 216. Machine learning system 200 may use output feature vector 216 in a backpropagation algorithm to update weights 210. Machine learning system 200 may repeat this process many times with different digital audio signals in training data 214 in order to update weights 210 in a way that results in the reduction of differences between the output feature vectors generated based on the digital audio signals in training data 214 and the associated target feature vectors. In this way, TFCNN 204 is trained to discriminate phonetic classes, such as senones. In other words, TFCNN 204 is trained such that output feature vector 216 indicates phonetic classes present in digital audio signals.

Furthermore, in the example of FIG. 2, machine learning system 200 may provide audio frames of reference audio signal 108 as input data to TFCNN 204. Returning to the example given earlier in this disclosure, reference audio signal 108 may be a recording of one of the lectures given by a professor. When machine learning system 200 runs forward passes of TFCNN 204 on audio frames of reference audio signal 108, machine learning system 200 may include the output features of the bottleneck layer of TFCNN 204 in a reference feature vector 208. Reference feature vector 208 is a vector of features. The features may be numerical values.

Machine learning system 200 may provide query utterance 106 as input data to TFCNN 204. For instance, in response to receiving a query request, query processing system 202 may instruct machine learning system 200 to run forward passes of TFCNN 204 using one or more audio frames of query utterance 106 as input data. Query utterance 106 may comprise a digital audio signal representing the sound of a keyword. Returning to the example given earlier in this disclosure, query utterance 106 may include a digital audio signal of the sound of the student saying the word "Agincourt." When machine learning system 200 runs a forward pass of TFCNN 204 on audio frames of query utterance 106, machine learning system 200 may store the output features of the bottleneck layer of TFCNN 204 in query feature vector 206. In some examples, the output features generated by the bottleneck layer have no specific semantic meaning. However, the output features generated by the bottleneck layer may be used by later layers of TFCNN 204 to generate output feature vectors that discriminate phonetic classes, such as senones.

As mentioned above, query processing system 202 may determine, based on query feature vector 206 and reference feature vector 208, at least one detection score corresponding to a level of confidence that reference audio signal 108 contains the query. Query processing system 202 may determine a detection score in one of a variety of different ways. Examples of how query processing system 202 determines the detection score are provided elsewhere in this disclosure.

Figure 3:
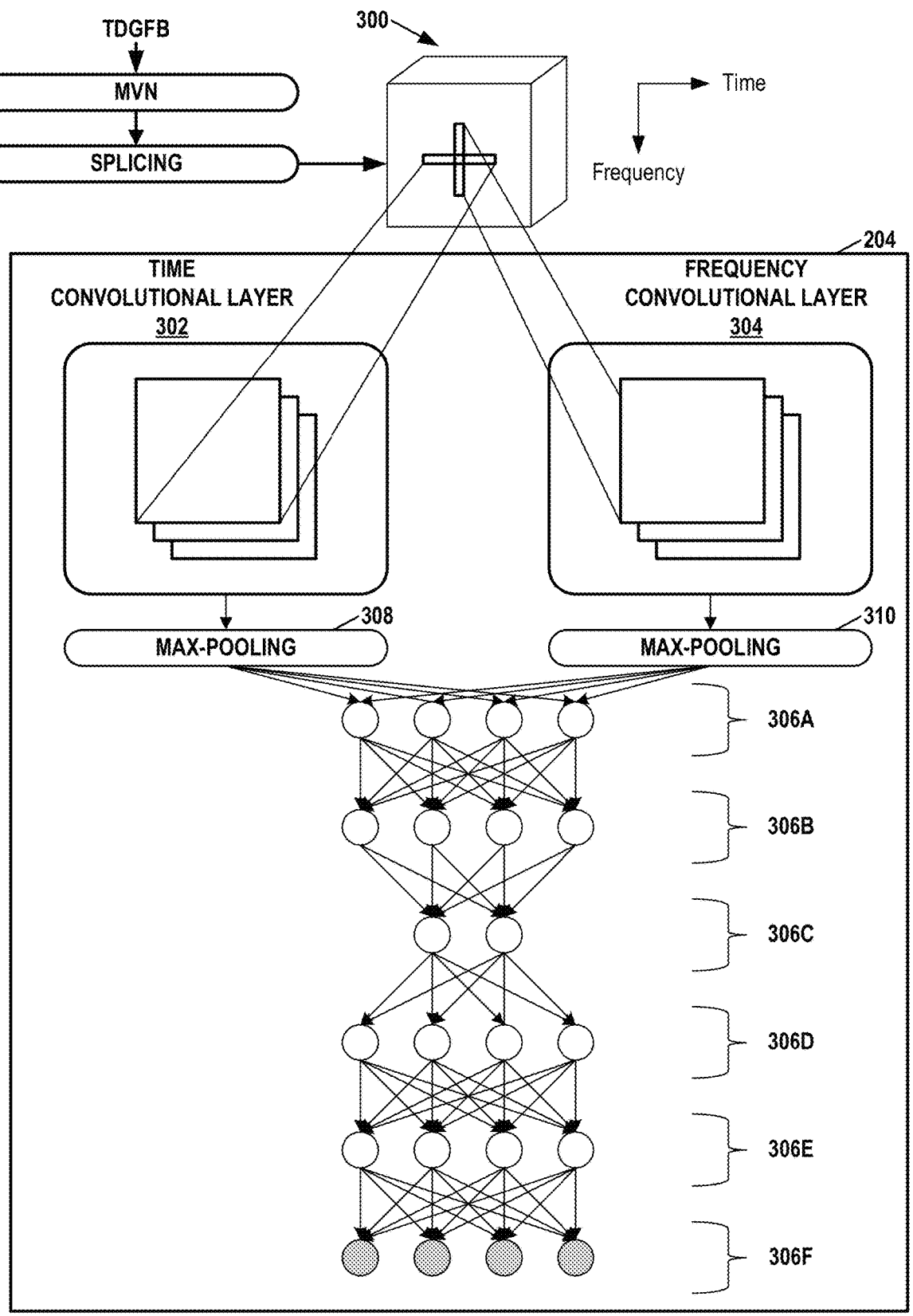
FIG. 3 is a conceptual diagram of an example time-frequency convolutional neural network (TFCNN) implemented in accordance with a technique of this disclosure.

FIG. 3 is a conceptual diagram illustrating an example TFCNN implemented in accordance with a technique of this disclosure. In the example of FIG. 3, input to TFCNN 204 may be represented as series of audio frames. Each audio frame may correspond to a time period. For example, each audio frame may correspond to a time period of 25.6 milliseconds (ms).

Each audio frame may comprise a 2-dimensional array of samples. Each sample in the array of samples may correspond to a different combination of a frequency band and a time band. A frequency band is a contiguous band of frequencies. A time band is a contiguous time period. Thus, an audio frame may be conceptualized as a two-dimensional array of samples with time corresponding to one axis and frequency corresponding to the other axis. Each of the samples in the array may indicate an energy of an audio signal in the frequency band corresponding to the sample and in the time band corresponding to the sample. In the example of FIG. 3, an audio signal (e.g., query utterance 106, reference audio signal 108, etc.) is conceptually represented as a cube 300 having a horizontal axis corresponding to time, a vertical axis corresponding to frequency, and a depth axis corresponding to audio frames.

In some examples, query processing system 202 (FIG. 1) or other system applies one or more filters to digital audio signals before providing the samples of digital audio signals to TFCNN 204 as input. For example, TFCNN 204 may be trained using time-domain gammatone filterbank (TDGFB) features. The gammatone filters are auditory inspired and have been shown to perform better than traditional filterbanks on tasks where noise and channel mismatches are an issue, either when used directly for ASR or as features for bottleneck training. In one example, the TDGFB features may be extracted by using a time-domain gammatone filterbank implementation consisting of 40 channels, with the filters equally spaced on the equivalent rectangular bandwidth (ERB) scale. The TDGFB features may comprise filterbank energies computed over an analysis window of 25.6 milliseconds (ms), at an audio frame advance of 10 ms, with the energies root-compressed using 15th power root followed by an utterance-level mean subtraction across each feature dimension. To tackle noise and channel mismatch, two different approaches to utterance-level feature normalization were tried on the TDGFB features: spectral mean subtraction (SMS) and spectral mean-variance normalization (spectral MVN or SMVN). SMVN may normalize mean and variance of time domain and TDGFB features. Because filters are applied to the digital audio signals, the input data provided to TFCNN 204 may be referred to as input filterbank features. In the example of FIG. 3, application of SMVN may be followed by splicing. Splicing is the process of adding contextual frames from the past and future into a current frame as an input to the network. For instance, query processing system 202 may add 7 previous frames into the current frame.

In FIG. 3, two parallel convolutional layers are used at the input of TFCNN 204, one performing convolution across time, and the other across the frequency axis of the input filterbank features. Specifically, in the example of FIG. 3, TFCNN 204 includes a time convolutional layer 302 and a frequency convolutional layer 304.

Time convolutional layer 302 applies first filters to first input feature vectors. A filter is represented by a vector of weights with which the input is convolved to detect different features of the input. The first input feature vectors being sets of the samples that correspond to a same frequency band and different time bands. As shown in the example of FIG. 3, a first input feature vector is a horizontal array of values in cube 300. The total field of input values for time convolutional layer 302 and frequency convolutional layer 304 may be limited to the samples in a single audio frame of an audio signal. Thus, machine learning system 200 may perform a separate forward pass of TFCNN 204 for each audio frame of an audio signal. Frequency convolutional layer 304 applies second filters to second input feature vectors. The second input feature vectors are sets of the samples that correspond to a same time band and different frequency bands. As shown in the example of FIG. 3, a second input feature vector is a vertical array of values in cube 300.

Thus, each neuron of time convolutional layer 302 may receive as input a plurality of the samples of the reference audio signal. For each neuron of time convolutional layer 302, each of the samples received by the neuron corresponds to the same frequency band and different time bands. Each neuron of frequency convolutional layer 304 may receive as input a plurality of the samples of the reference audio signal. For each neuron of frequency convolutional layer 304, each of the samples received by the neuron corresponds to the same time band and different frequency bands.

In some examples, an input feature map may be represented as a feature vector V or a feature vector U.

$$V = [V_1, V_2, \ldots V_f \ldots V_F]$$

$$U = [U_1, U_2, \ldots U_t \ldots U_T]^T \quad (2)$$

In equations (2), $V_f$ represents a feature vector at frequency band f and $U_t$ represents a feature vector at time band t. In this disclosure, T indicates transpose when T is used as a superscript. For frequency convolutional layer 304, assume that there are K frequency bands with N activations (i.e., N filters). The output values of frequency convolutional layer 304 may be represented as:

$$h_{k,n} = \sigma(\Sigma_{b=1}^{B-1} w_{b,n} V_{b+k}^T + \beta_n) \quad (3)$$

In equation (3), $h_{k,n}$ represents the output of the n'th filter for the k'th frequency band. For instance, k may indicate which row in the two-dimensional matrix of features is a starting row of a vertically-oriented set of features. In equation (3), σ indicates an activation function. B is a band size for convolution operation on V. In other words, B indicates how many features in the same time band are used to generate $h_{k,n}$. Furthermore, in equation (3), $w_{b,n}$ and $\beta_n$ represent weight and bias terms of frequency convolutional layer 304 for the n'th filter. Machine learning system 200 may learn the values of $w_{b,n}$ and $\beta_n$ during training of TFCNN 204.

Similarly, assume that there are L bands for time convolutional layer 302. In other words, there are L inputs to each neuron of time convolutional layer 302. Furthermore, assume there are M activations (i.e., M filters). The output values of time convolutional layer 302 may be represented as:

$$g_{l,m} = \sigma(\sigma(\Sigma_{c=1}^{C-1} \omega_{c,m} U_{c+l} + \gamma_m) \quad (4)$$

In equation (4), $g_{l,m}$ represents the output of a neuron for the m'th filter for the l'th time band. For instance, l may indicate which column of the two-dimensional matrix of features is a starting column of a horizontally-oriented set of features. Each of the different neurons for the l'th time band may correspond to a different frequency. In equation (4), σ indicates an activation function. C indicates how many features in the same frequency band are used to generate $g_{l,m}$. $\omega_{c,m}$ and $\gamma_m$ represent weight and bias terms for the m'th filter of time convolutional layer 302. Machine learning system 200 may learn the values of $\omega_{c,m}$ and $\gamma_m$ during training of TFCNN 204.

In addition, TFCNN 204 may include a series of additional layers 306A through 306F (collectively, "additional layers 306"). The series of additional layers 306 includes an input layer 306A, an output layer 306F, and a series of hidden layers (306B through 306E) between the input layer and the output layer. In the example of FIG. 3, the series of hidden layers includes five hidden layers. In other examples, the series of hidden layers may include more or fewer hidden layers. The additional layers 306 may form a fully-connected neural network. In other words, for each layer of additional layer 306 other than input layer 306A, each neuron in the layer is connected to each neuron in a previous layer.

Input to input layer 306A comprises output of time convolutional layer 302 and output of frequency convolutional layer 304. For instance, in some examples, the input to input layer 306A includes all values output by time convolutional layer 302 and frequency convolutional layer 304. In other examples, such as the example of FIG. 3, TFCNN 204 includes a first max pooling layer 308 and a second max pooling layer 310. Max pooling layer 308 may receive the values output by time convolutional layer 302 and output a subset of the values output by time convolutional layer 302. The subset output by max pooling layer 308 may consist of a given number (x) of the values output by time convolutional layer 302, where the values in the subset are the greatest values among the values output by time convolutional layer 302. Similarly, max pooling layer 310 may receive the values output by frequency convolutional layer 304 and output a subset of the values output by frequency convolutional layer 304. The subset output by max pooling layer 310 may consist of a given number (y) of values output by frequency convolutional layer 304, where the values in the subset are the greatest values among the values output by frequency convolutional layer 304. In some examples, x and y are the same. For instance, x and y may both be equal to 3. In other examples, x and y are different. For instance, x may be equal to 5 and y may be equal to 3. In other words, a max-pooling over three samples may be used for frequency convolution, while a max-pooling over five samples may be used for time convolution. The feature maps after both the convolution operations may be concatenated and then fed to input layer 306A. The use of first max pooling layer 308 and second max pooling layer 310 may help to ensure that only the most important information is passed to the additional layers 306 of TFCNN 204, which may accelerate training, may accelerate computation time in inference mode, and may reduce the consumption of computational resources.

The series of hidden layers includes a bottleneck layer that includes fewer neurons than a hidden layer that precedes the bottleneck layer in the series of hidden layers. In the example of FIG. 3, layer 306C is the bottleneck layer and layer 306B is the hidden layer that precedes the bottleneck layer in the series of hidden layers. In some examples, bottleneck layer 306C includes fewer neurons than a hidden layer that follows the bottleneck layer in the series of hidden layers. For ease of illustration, FIG. 3 shows bottleneck layer 306C as including two neurons and each other layer of the series of additional layer 306 as including four neurons. However, practical implementations would include significantly more neurons in each layer. For example, bottleneck layer 306C may have 60 neurons and each of layers 306 other than the bottleneck layer 306C may have 1024 neurons. Thus, in some examples, each layer of the series of additional layers 306 has a same number of neurons except bottleneck layer 306C which has fewer neurons than each other layer in the series of additional layers 306.

Machine learning system 200 (FIG. 2) may apply TFCNN 204 to samples of query utterance 106 at least through bottleneck layer 306C. For each audio frame of query utterance 106, bottleneck layer 306C generates a set of output features when machine learning system 200 applies TFCNN 204 to the samples in the audio of query utterance 106. Machine learning system 200 may then include the set of output features into query feature vector 206. For instance, machine learning system 200 may concatenate the set of output features to the end of query feature vector 206. As indicated above, query utterance 106 may be an example of an audio signal that contains a query.

Furthermore, machine learning system 200 may apply TFCNN 204 to samples of each audio frame of reference audio signal 108 at least through bottleneck layer 306C. Bottleneck layer 306C generates a set of output features when machine learning system 200 applies TFCNN 204 to the samples of an audio frame of reference audio signal 108. Machine learning system 200 includes the set of output features into reference feature vector 208. For instance, machine learning system 200 may concatenate the set of output features to the end of reference feature vector 208.

Figure 4:
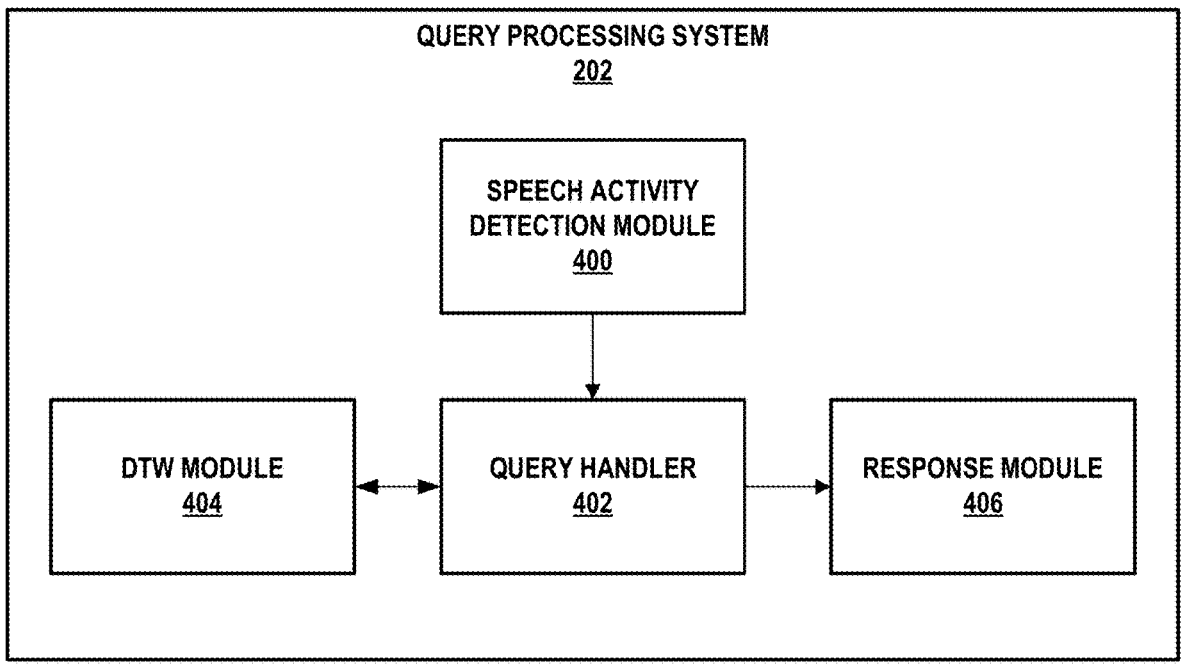
FIG. 4 is a block diagram illustrating example details of a query processing system.

FIG. 4 is a block diagram illustrating example details of query processing system 202. In the example of FIG. 4, query processing system 202 includes a speech activity detection (SAD) module 400, a query handler 402, a dynamic time warp (DTW) module 404, and a response module 406. In other examples, query processing system 202 may include more, fewer, or different components.

SAD module 400 analyzes an incoming digital audio signal to determine whether sounds represented by the incoming digital audio signal include human speech sounds. In some examples, SAD module 400 may provide a query utterance (e.g., query utterance 106 of FIG. 1 and FIG. 2) to query handler 402. The query utterance is an example of an audio signal that contains a query. The query utterance includes portions of the incoming digital audio signal that represent human voice sounds to query handler 402. In such examples, the query utterance does not provide portions of the incoming digital audio signal to query handler 402 that do not represent human voice sounds. Thus, SAD module 400 may remove pauses at the start and end of query utterance 106. Additionally, SAD module 400 may remove intra-word pauses and other non-speech audio frames that are due to channel distortions or background noise. For instance, SAD module 400 may apply speech activity detection to remove pauses at a start or stop of query utterance 106 prior to applying TFCNN 204 to audio frames of query utterance 106. In some examples, SAD module 400 may be implemented using the noise-robust SAD system developed under the Robust Automatic Transcription of Speech (RATS) project of the Defense Advanced Research Projects Administration (DARPA), which has been shown to perform well across a variety of challenging acoustic conditions.

In some examples, SAD module 400 generates a SAD score for each audio frame of query utterance 106 and reference audio signal 108. In some examples, SAD module 400 determines the SAD score using a neural network that is trained to detect human speech in an audio frame. The SAD score for an audio frame indicates a measure of confidence that sounds represented in the audio frame includes human speech sounds. SAD module 400 may then online enroll audio frames having SAD scores above a set threshold. In such examples, query handler 402 run forward passes of TFCNN 204 only on enrolled audio frames. This may reduce the amount of processing performed by computing system 100.

In the example of FIG. 4, query handler 402 provides audio frames of query utterance 106 to machine learning system 200 to determine whether reference audio signal 108, or set of reference audio signals, contains a query defined by query utterance 106. In response, query handler 402 may receive query feature vector 206 and reference feature vector 208 from machine learning system 200. Query handler 402 may use DTW module 404 to determine at least one detection score based on the query feature vector and the reference feature vector. The detection score may have a value indicating a level of confidence that reference audio signal 108 contains the query. In some examples, query handler 402 may determine, based on the detection score being greater than a predetermined threshold, that the reference audio signal contains the query. In some examples, such as that provided with respect to FIG. 7, query handler 402 may use the detection score in a process to determine a refined detection score. In some examples, DTW module may determine multiple detection scores for the reference audio signal. For instance, different detection scores may correspond to levels of confidence that different time segments within the reference audio signal contain the query.

DTW module 404 may determine a detection score by applying dynamic time warping to the query feature vector and the reference feature vector. In examples where DTW module 404 determines detection scores for a time segment of the reference audio signal, the reference feature vector is based on audio samples in the time segment. Dynamic time warping is an algorithm for measuring similarity between two sequences. Typically, dynamic time warping is used to measure similarity between two temporal sequences (hence the name dynamic "time" warping). However, dynamic time warping may be used for other types of sequences, such as query feature vector 206 and reference feature vector 208.

To use dynamic time warping to determine the detection score, DTW module 404 may generate joint distance matrix 218, which is shown in FIG. 2 as being stored in memory 104. Joint distance matrix 218 is a matrix having cells. Each cell in joint distance matrix 218 may be referred to herein as a "matrix frame." The matrix frames in joint distance matrix 218 correspond to different combinations of features of query feature vector 206 and features of reference feature vector 208. For ease of explanation, this disclosure assumes that the features of query feature vector 206 correspond to rows of joint distance matrix 218 and assumes that the features of reference feature vector 208 correspond to columns of joint distance matrix 218.

Each of the matrix frames of joint distance matrix 218 contains a value indicating a distance between features in the combination corresponding to the matrix frame. Furthermore, DTW module 404 may determine a best path through the matrix frames of joint distance matrix 218. In some examples, the best path may be defined such that a total of distances indicated by the matrix frames along the best path is less than totals of distances indicated by matrix frames along other evaluated paths through the matrix frames of joint distance matrix 218. In some examples, a best path may be defined as a path where a total of distances indicated by matrix frames along the path is less than a particular threshold. This may allow for there to be more than one best path in reference audio signal. The detection score may be based on the total of distances indicated by the matrix frames along the best path. For example, the detection score may be equal to the total of distances indicated by the matrix frames along the best path. In other examples, DTW module 404 may determine the detection score for a path by first normalizing the total accumulated distance for the path to a range (e.g., [0, 1]) and subtracting the resulting normalized distance from 1.

In general, each matrix frame in joint distance matrix 218 corresponds to a different combination of features in query feature vector 206 and reference feature vector 208. For example, matrix frame (0, 0) of joint distance matrix 218 may correspond to the combination of the first feature in query feature vector 206 and the first feature in reference feature vector 208; cell (0, 1) of joint distance matrix 218 may correspond to the combination of the first feature in query feature vector 206 and the second feature in reference feature vector 208; cell (1, 1) of joint distance matrix 218 may correspond to the combination of the second feature in query feature vector 206 and the second feature in reference feature vector 208; and so on. The value in a matrix frame of joint distance matrix 218 corresponding a combination of a feature in query feature vector 206 and a feature in reference feature vector 208 is a measure of the distance (i.e., a distance measure) between the feature in query feature vector 206 and the feature in reference feature vector 208.

DTW module 404 may use one of several distance measures to build joint distance matrix 218. For example, the distance measures may include Euclidean distance, correlation, city block distance, cosine distance, dot product, minus log dot product, and so on. In such examples, DTW module 404 may consider each feature in query feature vector 206 and each feature in reference feature vector 208 as a point in a two-dimensional space. An x-dimension coordinate of a feature of a feature vector (e.g., query feature vector 206 or reference feature vector 208) may correspond to the location of the feature within the feature vector. A y-dimension coordinate of the feature may correspond to the value of the feature. Thus, in an example where the distance metric is Euclidean distance, DTW module 404 may calculate the distance metric for a combination of a feature $(x_1, y_1)$ in query feature vector 206 and a feature $(x_2, y_2)$ in reference feature vector 208 as:

$$\sqrt{(x_1-x_2)^2+(y_1-y_2)^2} \quad (5)$$

Similarly, where the distance metric is cosine distance, the feature of query feature vector 206 may be denoted by the vector A and the feature of reference feature vector 208 may be denoted by the vector B, and vector position and element value are components of vectors A and B. In this example, the cosine distance may be given as:

$$\frac{\sum_{i=1}^{n} A_i B_i}{\sqrt{\sum_{i=1}^{n} A_i^2} \sqrt{\sum_{i=1}^{n} B_i^2}} \quad (6)$$

In equation (6), above, $A_i$ and $B_i$ are components of A and B.

In examples provided elsewhere in this disclosure, query feature vector 206 and reference feature vector 208 include the outputs of neurons in bottleneck layer 306C (FIG. 3). For instance, machine learning system 200 may calculate the output of a neuron as the output of an activation function of a sum of products of input values and corresponding weights, as shown in equation (1). Thus, with reference to equation (1), query feature vector 206 and reference feature vector 208 may include values $y_k$. However, in some examples, machine learning system 200 may be configured to generate query feature vector 206 and reference feature vector 208 to include raw activations from the bottleneck layer, which were extracted before applying the activation function, such as a sigmoid activation function. DTW module 404 may determine the joint distance matrix 218 based on query feature vectors and reference feature vectors generated in this manner. Thus, query feature vector 206 and reference feature vector 208 may include values $y_k$ as defined in equation (7), below.

$$y_k = \left( \sum_{j=0}^{m} w_{kj} x_j \right) \quad (7)$$

In some examples, machine learning system 200 may be configured to generate query feature vector 206 and reference feature vector 208 to include transformed activations from the bottleneck layer. DTW module 404 may determine the joint distance matrix 218 based on query feature vectors and reference feature vectors generated in this manner. Thus, in such examples, query feature vector 206 and reference feature vector 208 may include values $y_k$ as defined in equation $$y_k = \varphi' \left( \sum_{j=0}^{m} w_{kj} x_j \right) \quad (8)$$

In equation (8), $\varphi'$ denotes a transformation function other than the activation function used to generate output that the bottleneck layer passes to a next layer of TFCNN 204. For example, $\varphi'$ may be a sigmoid function, a softmax function, a 1-sigmoid function, or another function. Experiments showed that the 1-sigmoid function turned out to perform the best when combined with cosine distance, and corresponded to a flipped sigmoid, where large positive activations were mapped close to 0, while large negative activations were mapped to close to 1. The gain over MediaEval QUESST 2014 using this flipped sigmoid over the classic sigmoid with cosine distance was 2:5% relative using the $minC_{n \times e}$ metric.

After determining the values in the cells of joint distance matrix 218, DTW module 404 may determine a best path through the cells of joint distance matrix 218. In one example, DTW module 404 may determine the best path using the following algorithm:

| DTW ALGORITHM 1 |
| --- |
| int DTWDistance(s: array [1..n], t: array [1..m]) { <br>  DTW := array [0..n, 0..m] <br>  for i := 1 to n <br>    DTW[i, 0] := infinity <br>  for i := 1 to m <br>    DTW[0, i] := infinity <br>  DTW[0, 0] := 0 <br>  for i := 1 to n <br>    for j := 1 to m <br>      cost := d(s[i], t[j]) <br>      DTW[i, j] := cost + minimum( DTW[i-1  , j   ],   // insertion <br>                                                                DTW[i   , j-1 ],   // deletion <br>                                                               DTW[i-1, j-1 ])   // match <br>  return DTW[n, m] <br>} |

In the algorithm above, the array s may correspond to query feature vector 206 and array t may correspond to reference feature vector 208. Furthermore, in the algorithm above, d(x, y]) corresponds to joint distance matrix 218. ":="

denotes the assignment operation. Furthermore, in the algorithm above, DTW[i, j] is the distance between s and t with the best alignment (e.g., the least cost path).

Thus, in the example algorithm above, DTW module 404 may initialize a total accumulated distance value to 0 (i.e., DTW [0, 0]:=0) at each column of reference audio signal 108 in order to allow the best paths to start from anywhere in reference audio signal 108. In other words, DTW module 404 may repeat the algorithm 1 for each matrix frame of reference audio signal 108. DTW module 404 may progressively compute the minimum accumulated distance through joint distance matrix 218 between query utterance 106 and reference audio signal 108. Joint distance matrix 218 is between query utterance 106 and reference audio signal 108 in the sense that DTW module 404 may generate joint distance matrix 218 using feature vectors generated by TFCNN 204 using query utterance 106 and reference audio signal 108. In some examples, local path constraints only allowed moving horizontally, vertically, or diagonally by one matrix frame at a time. Query handler 402 may normalize the total accumulated path distances when making decision about which paths are more likely to correspond to segments of reference audio signal 108 that contain the query.

For each column of joint distance matrix, DTW module 404 may determine whether a normalized accumulated distance of a path ending at the column is a local minimum relative to normalized accumulated distances of paths ending at neighboring columns. If the path ending at the column is a local minimum, this disclosure may refer to the column as a local minimum column. Query processing system 202 may then perform pairwise comparison of all detections for a particular query, which may enable merging the detections overlapping by more than a threshold level (e.g., 50%), by keeping the detection of least normalized distance. In other words, query processing system 202 may consider two or more paths to correspond to the same occurrence of the merged query exemplar if the paths overlap more at more than the threshold among along the normalized lengths of the paths.

For each local minimum column, DTW module 404 may retrieve a stored starting matrix frame for the path ending at the local minimum column. In other words, DTW module 404 may retrieve data indicating the column at which the path starts. Based on the data indicating the column at which the path starts, query handler 402 may determine an audio frame of reference audio signal 108 in which an instance of query utterance 106 starts.

In some examples, DTW module 404 implements the search for best paths using subsequence dynamic time warping (DTW) as described in M. Muller, "Information Retrieval for Music and Motion," Springer-Verlag, 2007, with the memory-efficient improvements described in X. Anguera and M. Ferrarons, "Memory efficient subsequence DTW for query-by-example spoken term detection," in 2013 IEEE International Conference on Multimedia and Expo (ICME), July 2013, pp. 1-6. That is, DTW module 404 may perform DTW algorithm 2, presented below:

---
DTW ALGORITHM 2
---
Input: X; Y sequences of feature vectors
Output: Y $(a_i^*:b_i^*)$ ; i = 1 : K matching subsequences
Initialize vectors $D_1' \leftarrow \infty$, $C_1' \leftarrow 0$, $S_1' \leftarrow 0$
for m = 1 to M do
  for n = 1 to N do ---
DTW ALGORITHM 2
---
    if n == 1 then
      $D_2'(1) \leftarrow d(n,m)$, $C_2'(1) \leftarrow 1$
    else
      Apply local constraints to $D_2'(n)$
    end if
  end for
  if $D_1'(N)/C_1'(N)$ is a local minimum then
    Consider match at $b^* = m$ and retrieve $a^* = S(N, b^*)$
  end if
  swap vectors D', C', and S'
end for
return top K matching subsequences

---

In DTW algorithm 2 above, sequence X may be reference feature vector 208 and sequence Y may be query feature vector 206. This is consistent with the convention described above of arranging features of reference feature vector 208 along a x-axis of joint distance matrix 218, such that features of reference feature vector 208 correspond to columns of joint distance matrix 218, and arranging features of query feature vector 206 along a y-axis of joint distance matrix 218, such that features of query feature vector 206 correspond to columns of joint distance matrix 218. Furthermore, in DTW algorithm 2, $a^*$ is a sequence start, $b^*$ is an optimum ending point, $d(n, m)$ is joint distance matrix 218, M is a length of sequence X (i.e., the number of features in reference feature vector 208), and N is a length of sequence Y (i.e., the number of features in query feature vector 206). In DTW algorithm 2, $D_1'$ and $D_2'$ are vectors storing accumulated distance for paths, $C_1'$ and $C_2'$ are vectors storing current path length, $S_1'$ and $S_2'$ are vectors storing starting matrix frames of paths. Furthermore, in DTW algorithm 2 described above, to apply the local constraints to $D_2'(n)$, DTW module 404 may set $D_2'(n)$ is the output of equation (9), below:

$$D(n, m) = \min \begin{cases} \dfrac{d(n-1, m) + d(n, m)}{C(n-1, m) + 1} \\ \dfrac{D(n-1, m-1) + d(n, m)}{C(n-1, m-1) + 2} \\ \dfrac{D(n, m-1) + d(n, m)}{C(n, n-1) + 1} \end{cases} \quad (9)$$

In equation (9), C(n, m) stores the length of the best alignment path leading to each point (n, m). D(n, m) is an accumulated cost matrix. Furthermore, in DTW algorithm 2, DTW module 404 swaps the content of vector $D_1$ with the content of vector $D_2$ (i.e., swaps vectors D'), swaps the content of vector $C_1$ with the content of vector $C_2$ (i.e., swaps vectors C'), and swaps the content of vector $S_1$ with the content of vector $S_2$ (i.e., swaps vectors S') so that vectors $D_2$, $C_2$ and $S_2$ become available to be filled in the next step. Thus, at each step, the memory-efficient implementation of DTW algorithm 2 only stores three values per path: the starting frame, the current path length, and an accumulated distance.

In DTW algorithm 2, if $D_1'(N)/C_1'(N)$ is a local minimum (e.g., $D_1'(N)/C_1'(N)$ is less than $D_1'(N-1)/C_1'(N-1)$ and $D_1'(N+1)/C_1'(N+1)$), DTW module 404 may consider matrix frame m to be an optimum ending point of a path (i.e., DTW module 404 sets $b^*$ equal to m). Additionally, DTW module 404 may retrieve, from the S matrix for the path ending at the matrix frame corresponding to the last feature of query feature vector 206, data indicating a starting position of the path.

In some examples, query handler 402 normalizes the distance along a path in order to determine a detection score for the path. Because the query utterance may occur multiple times in reference audio signal 108, multiple paths through joint distance matrix 218 may correspond to instances of query utterance 106 in reference audio signal 108. Normalizing the detection score for a path may help to ensure the detection score for a path is comparable to normalized detection scores for other paths. For example, computation engine 102 may need to rank audio frames in reference audio signal 108 in terms of confidence that an instance of query utterance 106 starts in the audio frames. In this example, DTW module 404 may use normalized detection scores for paths as measures of confidence that instances of query utterance 106 start in audio frames of reference audio signal 108 corresponding to beginnings of the paths.

DTW module 404 may determine a detection score for a path in various ways. For instance, in one example, DTW module 404 may first normalize the total of distances indicated by the matrix frames along the path to generate a normalized distance, denoted $D_{norm}$, that is in a range of [0, 1]. To normalize the total of distances, DTW module 404 may, for each of the matrix frames along the path, divide the distance indicated by the matrix frame by a length of a path measured using Manhattan distance; DTW module 404 may then sum the resulting values to determine the normalized distance. Thus, in this example, the normalized distance (i.e., $D_{norm}$) of any path through any joint distance matrix lies in the range of [0, 1]. Because $D_{norm}$ is in the range of [0, 1] and because a path with higher accumulated distance may correspond to less confidence that an instance of query utterance 106 starts in the starting audio frame for the path, DTW module 404 may map $D_{norm}$ to a detection score S for the path. For instance, DTW module 404 may map $D_{norm}$ to detection score S as follows:

$$S=1-D_{norm} \quad (10)$$

In some examples, it may be desirable to compare detection scores for different queries and/or reference audio signals. When plotting distributions of detection scores for queries, distributions of detection scores are found to be unimodal, but the means and variances of such distributions are found to be dependent on each query. Accordingly, DTW module 404 may normalize detection scores based on a distribution in order to determine a standardized detection score across queries. DTW module 404 may use various distributions to normalize detection scores. For example, DTW module 404 may use a Gaussian distribution, z-normalization, or another distribution. Because the distributions are not quite Gaussian distributions, but rather actually have longer tails toward lower scores, using z-normalization was not found to be an optimal way to normalize scores across queries. In another example, DTW module 404 may use a rank normalization which maps each distribution to a uniform distribution. In another example, DTW module 404 may use an m-norm procedure, as described in I. Szoke, M. Skacel, L. Burget, and J. H. Cernocky, "Coping with channel mismatch in query-by-example—BUT QUESST 2014," in Proceedings of MediaEval 2014 Workshop, 2014.

Figure 5:
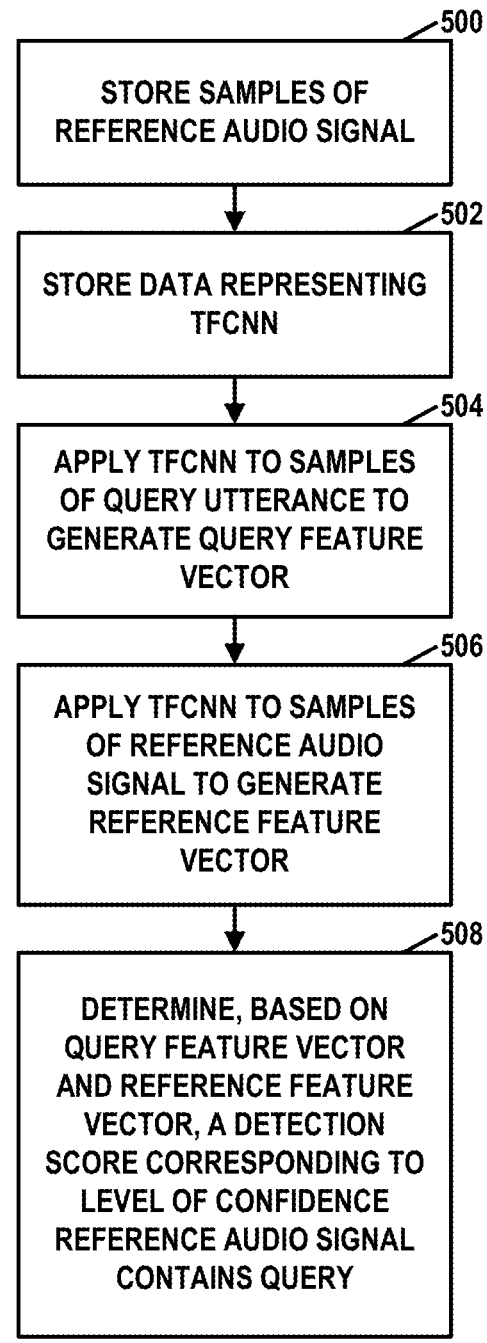
FIG. 5 is a flowchart illustrating an example operation for determining whether a reference audio signal contains a query utterance.

FIG. 5 is a flowchart illustrating an example operation for determining whether a reference audio signal contains a query. In the example of FIG. 5, computing system 100 (FIG. 1) may store, in one or more computer-readable storage media (e.g., memory 104 of FIG. 1), samples of reference audio signal 108 (500). Each of the samples of reference audio signal 108 corresponds to a different combination of a time band and a frequency band. In some examples, each of the samples of reference audio signal 108 indicates an energy of reference audio signal 108 at the frequency band corresponding to the sample and at the time band corresponding to the sample of reference audio signal 108.

The computer-readable storage media may also store data representing TFCNN 204 (502). For instance, the computer-readable storage media may store weights 210, data indicating bias terms, data describing an architecture of TFCNN 204, and/or other data that defines TFCNN 204. In this example, TFCNN 204 includes a time convolutional layer 302 (FIG. 3) that applies first filters to first input feature vectors. The first input feature vectors are sets of the samples that correspond to a same frequency band and different time bands. TFCNN 204 also includes a frequency convolutional layer 304 (FIG. 3) that applies second filters to second input feature vectors. The second input feature vectors are sets of the samples that correspond to a same time band and different frequency bands. TFCNN 204 also includes a series of additional layers (e.g., layers 306 of FIG. 3). The series of additional layers include an input layer (e.g., layer 306A of FIG. 3), an output layer (e.g., layer 306F of FIG. 3), and a series of hidden layers (e.g., layers 306B through 306E of FIG. 3) between the input layer and the output layer. Input to the input layer comprises output of time convolutional layer 302 and output of frequency convolutional layer 304. The series of hidden layers includes a bottleneck layer (e.g., bottleneck layer 306C of FIG. 3) that includes fewer neurons than a hidden layer that precedes the bottleneck layer in the series of hidden layers. In some examples, the series of hidden layers consists of 5 hidden layers, each of the hidden layers other than the bottleneck layer has a total of 1024 neurons, the bottleneck layer occurs third among the hidden layers, and the bottleneck layer has a total of 60 neurons.

As noted above, TFCNN 204 may include a first max pooling layer (e.g., max pooling layer 308 of FIG. 3) and a second max pooling layer (e.g., max pooling layer 310 of FIG. 3). Inputs of the first max pooling layer are outputs of time convolutional layer 302. The first max pooling layer groups the inputs into a first set of sub-regions. Outputs of the first max pooling layer include a maximum input into each sub-region of the first set of sub-regions. The outputs of the first max pooling layer are the inputs to the input layer of the series of additional layers 306. Inputs of the second max pooling layer are outputs of frequency convolutional layer 304. The second max pooling layer groups the inputs into a second set of sub-regions. Outputs of the second max pooling layer include a maximum input into each sub-region of the second set of sub-regions. The outputs of the second max pooling layer are the inputs to the input layer of the series of additional layers 306. In some examples, each sub-region of the first set of sub-regions consists of 5 values and each sub-region of the second set of sub-regions consists of 3 values.

In some examples, computation engine 102 may train TFCNN 204 for feature extraction in a multilingual fashion using speech material from various languages and datasets. For instance, in one example of training TFCNN 204, TFCNN 204 was trained using speech material from seven languages and various datasets: Assamese (BABEL); Bengali (BABEL); Dari (TransTac); Egyptian Arabic (CALLHOME); English (Fisher); Mandarin (GALE); and Spanish (CALLHOME). In this example, the following Babel data releases were used: Amharic, IARPA-babel307bv1.0b;

Assamese, IARPA-babel102b-v0.5a; Bengali, IARPAbabel103b-v0.4b; and Pashto, IARPA-babel104b-v0.4bY. Full-ILP training sets were used. In total, this data comprised approximately 650 hours of audio data in the seven languages. All data was sampled at 8 kHz. Note that neither speaker- nor language-level information was ever used in any of the processing. A universal phone set was created by linguistic experts to map phones from all seven languages to a unified set. Acoustic clustering of triphones was then used to create more than 5,000 senones, which were used as targets for the output layer of a TFCNN 204.

Furthermore, in the example of FIG. 5, computation engine 102 applies TFCNN 204 to samples of query utterance 106 at least through the bottleneck layer to generate query feature vector 206 (504). As noted above, the samples of query utterance 106 may be divided into one or more audio frames. Computation engine 102 may apply TFCNN 204 to samples in each of the audio frames. When computation engine 102 applies TFCNN 204 to samples in an audio frame, the bottleneck layer generates a set of output values. Computation engine 102 may concatenate the sets of output values generated based on the audio frames to generate the query feature vector. Thus, query feature vector 206 may comprise output values of the bottleneck layer generated when computation engine 102 applies TFCNN 204 to the samples of query utterance 106. Query utterance 106 may be an example of an audio signal that contains the query. Because the bottleneck layer has fewer output features and other ones of the additional layers, use of the output features of the bottleneck layer may advantageously reduce the dimensionality of the data used for determining whether an instance of query utterance 106 starts in an audio frame of reference audio signal 108. This may reduce usage of computational resources and potentially may accelerate the process of determining whether reference audio signal 108 contains the query.

Computation engine 102 applies TFCNN 204 to samples of reference audio signal 108 at least through the bottleneck layer (506). As noted above, the samples of query utterance 106 may be divided into one or more audio frames. Computation engine 102 may apply TFCNN 204 to samples in each of the audio frames. When computation engine 102 applies TFCNN 204 to samples in an audio frame, the bottleneck layer generates a set of output values. Computation engine 102 may concatenate the sets of output values generated based on the audio frames to generate reference feature vector 208. Thus, reference feature vector 208 may comprise output values of the bottleneck layer generated when computation engine 102 applies TFCNN 204 to the samples of reference audio signal 108.

In some examples, computation engine 102 applies speech activity detection to remove pauses at a start or stop of query utterance 106 prior to applying TFCNN 204 to the samples of query utterance 106. Additionally, in some examples, computation engine 102 applies speech activity detection to remove pauses at a start or stop of reference audio signal 108 prior to applying TFCNN 204 to the samples of reference audio signal 108. Computation engine 102 may apply speech activity detection in accordance with any of the examples provided elsewhere in this disclosure.

Furthermore, in the example of FIG. 5, computation engine 102 determines, based on query feature vector 206 and reference feature vector 208, a detection score corresponding to a level of confidence that reference audio signal 108 contains the query (508). For instance, as described elsewhere in this disclosure, computation engine 102 may determine the detection score based on an accumulated distance of a path determined by applying dynamic time warping to query feature vector 206 and reference feature vector 208. In this example, computation engine 102 may determine, based on the detection score, whether the reference audio signal 108 contains the query. In some examples, computation engine 102 may determine, based on the detection score being less than a predetermined threshold, that the reference audio signal contains the query.

Computation engine 102 may apply dynamic time warping in any one of a variety of ways, as described elsewhere in this disclosure. For instance, computation engine 102 may generate joint distance matrix 218 (FIG. 2). Matrix frames in joint distance matrix 218 correspond to different combinations of features of query feature vector 206 and features of reference feature vector 208. Each of the matrix frames of joint distance matrix 218 may contain a value indicating a distance between features in the combination corresponding to the matrix frame. Furthermore, computation engine 102 may determine a best path through the matrix frames of joint distance matrix 218. In some examples, a total of distances indicated by the matrix frames along the best path is less than totals of distances indicated by matrix frames along other evaluated paths through the matrix frames of joint distance matrix 218. The detection score may be based on the total of distances indicated by the matrix frames along the best path. Computation engine 102 may determine the best path in one of various ways, including the ways described elsewhere in this disclosure.

In some examples, after determining detection score, computation engine 102 may generate, based on detection score, an indication of whether reference audio signal 108 contains the query. For instance, computation engine 102 may determine that reference audio signal 108 contains the query if the detection score is below a particular threshold. In such examples, computing system 100 may output the indication. For instance, computing system 100 may output query response 110 (FIG. 1). In some examples, the indication is an indication to a user. In some examples, computation engine 102 may output the detection score.

Figure 6:
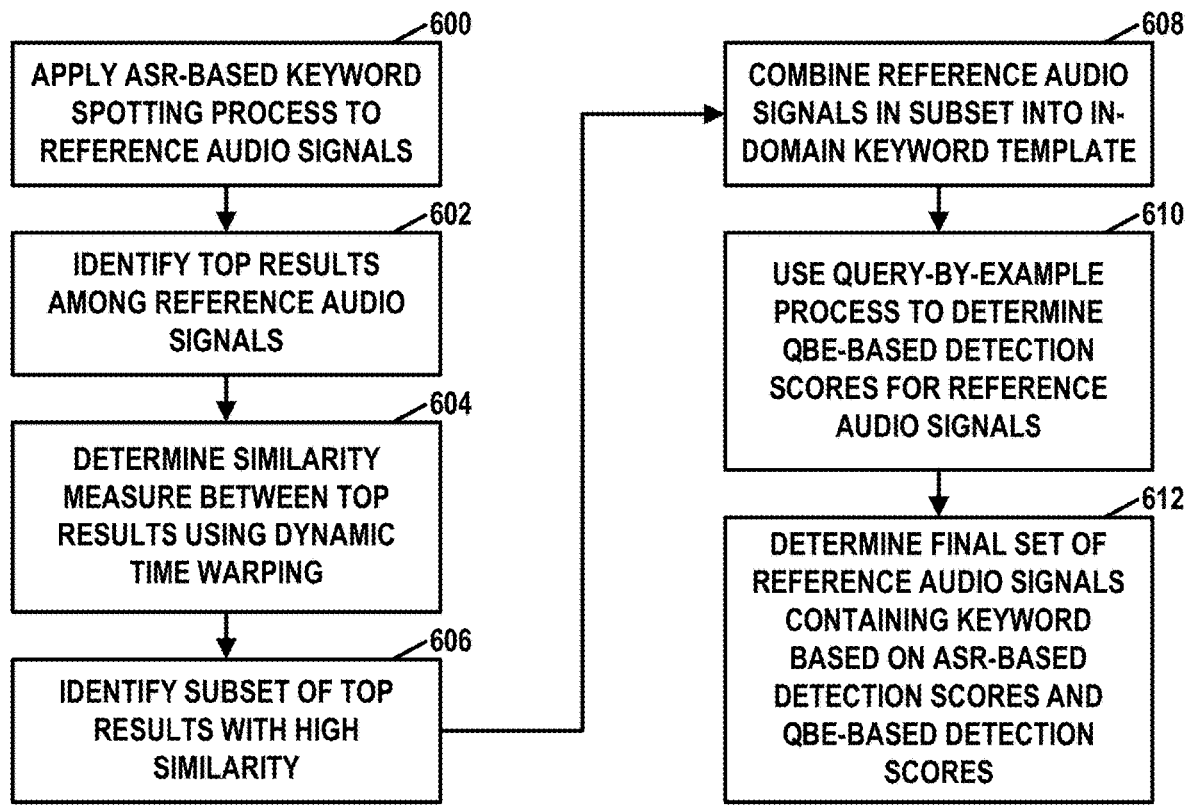
FIG. 6 is a flowchart illustrating an example operation for keyword spotting on unseen data using query by example (QbE) techniques.

FIG. 6 is a flowchart illustrating an example operation for keyword spotting on unseen data using QbE techniques. As discussed in Mitra et al., "Speech recognition in unseen and noisy channel conditions," Acoustics, Speech and Signal Processing (ICASSP), 2017 IEEE International Conference, pp. 5215-5219, IEEE, 2017, traditional KWS systems suffer a significant loss in performance when operating on unseen acoustic conditions. Unseen acoustic conditions are acoustic data from an environment on which the model has not been trained. While adaptation of the underlying acoustic and language models can help bridge that gap, the best results are only obtained when a significant amount of in-domain word-annotated data is available. Fully unsupervised adaptation techniques exist, which attempt to adapt the entire acoustic space based on high confidence regions, but gains are comparatively small.

As described in this disclosure, KWS performance and confidence may be improved in unseen conditions by leveraging the QbE techniques of this disclosure in a joint modeling approach. Using the QbE techniques of this disclosure, computation engine 102 may find keywords in a new acoustic condition using very little training data because it focuses on building an in-domain model only for keywords, instead of adapting its model to cover every word in the language, like traditional ASR-based KWS does. In some examples of this disclosure, computation engine 102 uses QbE techniques to automatically post-process the KWS output of a given dataset to potentially lower false alarms, improve recall, and obtain better score confidence in general. The three steps of one example approach can be summarized as follows:

1. Assess similarity to exclude false detections: Computation engine 102 may run pairwise comparisons of the top scoring KWS detections for each keyword using dynamic time warping. This may help computation engine 102 eliminate some KWS mistakes and may help computation engine 102 determine which detections are most similar and, therefore, likely to be correct.
2. Run QbE using high-quality keyword enrollments: Computation engine 102 uses step 1 to select the best examples for each keyword and enroll them in a QbE model. Because these examples match the test-set conditions, computation engine 102 may be likely to surface detections that the first pass KWS may have missed.
3. Joint KWS/QbE confidence modeling: Computation engine 102 generates a confidence measure combining the first-pass KWS confidence with the second-pass QbE confidence. Computation engine 102 may use one of multiple confidence models from simple averages to model-based logistic regression and simple neural networks.

As shown in the example of FIG. 6, computation engine 102 may apply an ASR-based keyword spotting process to a set of reference audio signals (600). Julien van Hout et al., "Recent Improvements in SRI's Keyword Detection System for Noisy Audio," In Fifteenth Annual Conference of the International Speech Communication Association. 2014 describes one example ASR-based keyword spotting process that computation engine 102 may apply to a set of reference audio signals.

By applying the ASR-based keyword spotting process to the set of reference audio signals, computation engine 102 may determine an ASR-based detection score for each of the reference audio signals. The ASR-based detection score for a reference audio signal may indicate a confidence that the reference audio signal includes sound representing a keyword. Computation engine 102 may then identify, based on the detection scores for the reference audio signals, top results among the reference audio signals (602). For instance, computation engine 102 may identify a reference audio signal as being among the top results if an ASR-based detection score for the reference audio signal is above a threshold. In some examples, the top results may be limited to a predefined number of reference audio signals.

Additionally, computation engine 102 may use dynamic time warping to determine similarity measures between top results among the set of reference audio signals (604). In other words, for each pair of reference audio signals in the top results, computation engine 102 may use dynamic time warping to determine a similarity measure. The similarity measure may be the cost of a best path. Computation engine 102 may use various dynamic time warping algorithms to determine the similarity measures, including the dynamic time warping algorithms described in this disclosure.

Computation engine 102 may then identify a subset of the top results based on the similarity measures (606). Computation engine 102 may limit the subset of the top results to those reference audio signals that have the greatest similarity to one another. For example, computation engine 102 may include a pair of reference audio signals in the subset if the similarity measure for the pair of reference audio signals is above a threshold, such as a predefined threshold. Conversely, in this example, if the similarity measures for pairs of reference audio signal including a particular reference audio signal are not above the threshold, computation engine 102 does not include the particular reference audio signal in the subset. Excluding reference audio samples from the subset that are dissimilar from other top results may help computation engine 102 eliminate keyword spotting mistakes made by the ASR-based keyword spotting system.

Next, computation engine 102 may combine the reference audio signals in the subset into an in-domain keyword template (608). Computation engine 102 may combine the reference audio signals into the in-domain keyword template in one of various ways. For example, computation engine 102 may generate a merged query exemplar as set forth in FIG. 7. In some examples, combining the reference audio signals into the in-domain keyword template is similar to steps 704 (align) and 714 (average frame-by-frame, possibly using weights), described below. This process merges several sequences of bottleneck features. First, computation engine 102 may pick a longest example "a" and run a DTW process with another example "b" to find an alignment path. Then, for each frame of the original example "a", computation engine 102 may find aligned frames of "b" and computation engine may add the bottleneck features from that frame of "a" with the average bottleneck features from all frames of "b" that aligned. Computation engine 102 may repeat this process with examples "c", "d", etc. until all examples are accounted for, then may divide the merged example with the total number of examples. In other examples. In other examples, computation engine 102 may use each of the reference audio signals independently to create a similarity score; computation engine 102 may then fuse those similarity scores at a later stage.

Computation engine 102 may then use a QbE process to determine QbE-based detection scores for the reference audio signals (610). The QbE-based detection score for a reference audio signal is a level of confidence that the reference audio signal contains a query defined by the in-domain keyword template. Computation engine 102 may use various QbE processes to determine the QbE-based detection scores. For instance, computation engine 102 may use the QbE techniques described in this disclosure (e.g., with respect to FIGS. 1-5) with the in-domain keyword template as query utterance 106 and with each of reference audio signals as reference audio signal 108.

Computation engine 102 may determine a final set of the reference audio signals containing the keyword based on the ASR-based detection scores and the QbE-based detection scores (612). For example, computation engine 102 may determine that the final set of the reference audio signals includes a reference audio signal if the ASR-based detection score for the reference audio signal is above a first threshold and the QbE-based detection score for the reference audio signal is above a second threshold. In this example, the first threshold and the second threshold may be the same or different. In some examples, computation engine 102 may output an indication of the final set of reference audio signals to a user or another computing process. In some examples, computation engine 102 may determine final detection scores for the reference audio signals based on weighted averages of the ASR-based detection scores and the QbE-based detection scores. In such examples, computation engine 102 may use the final detection scores to determine the final set of reference audio signals.

Thus, when the example of FIG. 6 is taken in conjunction with the example of FIG. 5, the query utterance of FIG. 5 may be the in-domain keyword template of FIG. 6, the reference audio signal of FIG. 5 is in the set of reference audio signals of FIG. 6, the detection score corresponding to the level of confidence that the reference audio signal contains the query in FIG. 5 is a QbE-based detection score for the reference audio signal, and computation engine 102 is further configured to apply an ASR-based keyword spotting process to the set of reference audio signals to determine ASR-based detection scores for the reference audio signals. Furthermore, computation engine 102 may identify, based on the ASR-based detection scores for the reference audio signals, a set of top results among the set of reference audio signals. Computation engine 102 may then determine similarity measures between the top results using dynamic time warping. Computation engine 102 may identify a subset of the top results based on the similarity measures. Furthermore, computation engine 102 may combine reference audio signals in the subset of the top results into the in-domain keyword template (e.g., the query utterance of FIG. 5). Computation engine 102 may apply the operation of FIG. 5 to the subset of the top reference audio signals to determine QbE-based detection scores. For each of the subset of top reference audio signals, computation engine 102 may then determine a final detection score for the reference audio signal based on the QbE-based detection score for the reference audio signal and the ASR-based detection score for the reference audio signal.

Figure 7:
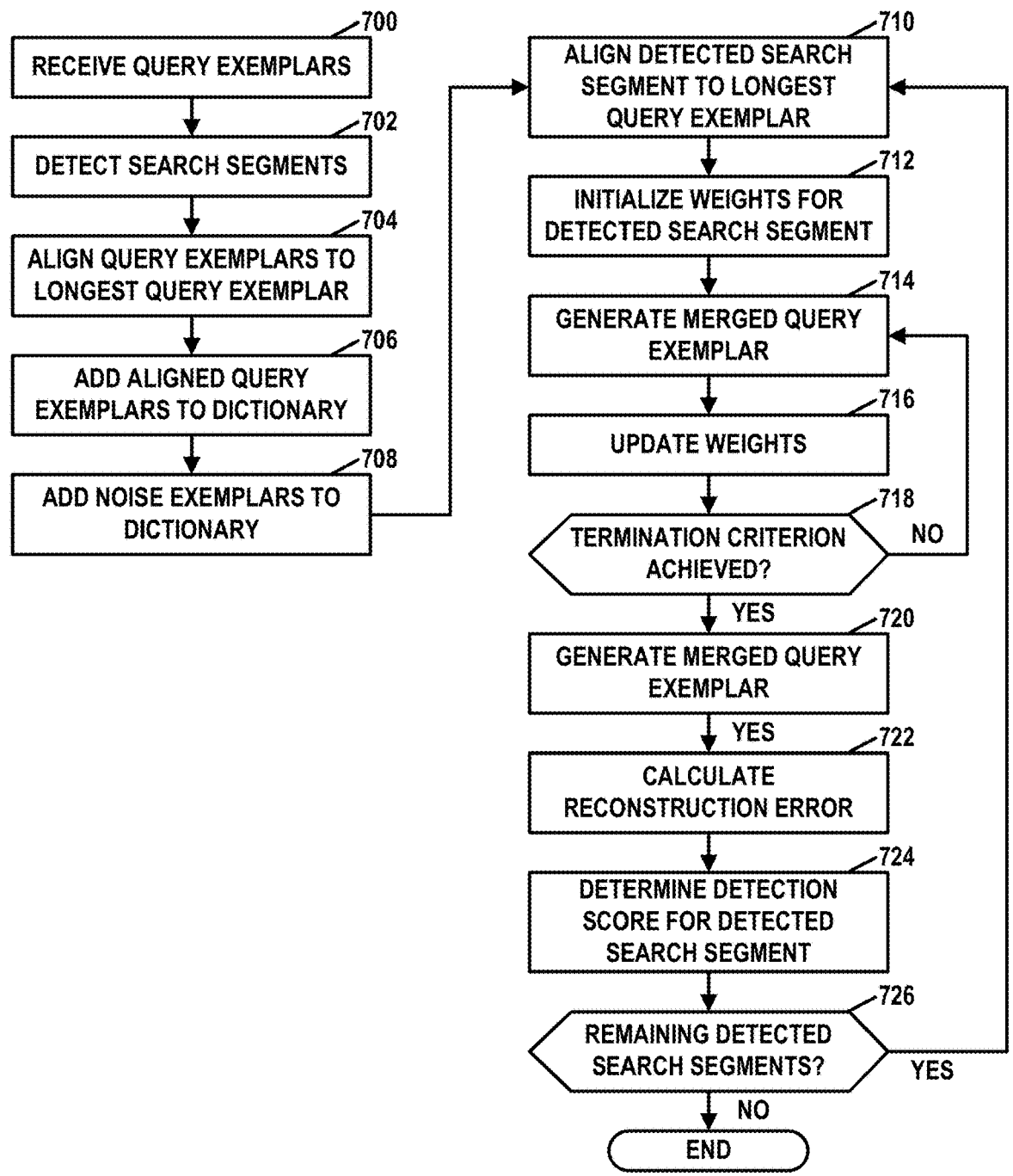
FIG. 7 is a flowchart illustrating an example operation for determining a refined detection score.

FIG. 7 is a flowchart illustrating an example operation for determining a refined detection score. This disclosure explains the actions of FIG. 7 as being performed by query processing system 202, and components thereof, as shown in FIG. 4. However, the actions of FIG. 7 may be performed separately from query processing system 202 or by a computing system other than computing system 100 (FIG. 1). Furthermore, although FIG. 7 is explained with reference to TFCNN 204, other neural network architectures may be used, such as a CNN with bottleneck features that does not include the time and frequency convolutional layers.

In the example of FIG. 7, query processing system 202 may receive a plurality of query exemplars (700). Each of the query exemplars may be an audio signal of a sound that defines the same query. For instance, continuing the example from earlier in this disclosure, the query exemplars may be audio signals representing the sounds of different people saying the word "Agincourt."

Query processing system 202 may detect one or more search segments in one or more reference audio signals (702). Query processing system 202 may detect the one or more search segments in one of a variety of ways. For example, query processing system 202 may apply subsequence dynamic time warping (sDTW) with each example separately and detections (i.e., detected search segments) are merged in a late-stage fashion using principled fusion or a voting system. Another example process to detect the one or more search segments is provided below in this disclosure. This disclosure may refer to a detected search segment as a "detection."

The remaining steps of FIG. 7 may improve the accuracy of detection scores for the detections generated action (702). Specifically, in the example of FIG. 7, query processing system 202 may align the query exemplars to the longest one of the query exemplars (704). Thus, each of the query exemplars may be represented using the same number of features, such as audio frames. To align a first query exemplar to a longer, second query exemplar, query processing system 202 may perform a DTW operation on the first query exemplar and the second query exemplar to find a path that minimizes an average accumulated frame-wise distance between bottleneck features. Once query processing system 202 has determined the path, query processing system 202 may stretch the first query example to have the same length as the second query example. By using the longest query exemplar as the reference alignment, query processing system 202 may reduce the amount of compression through averaging and maintaining the best resolution.

Additionally, query processing system 202 may add the aligned query exemplars to a dictionary (706). Thus, the entries in the dictionary may include the aligned query exemplars. The dictionary may be considered a matrix with rows corresponding to the aligned query exemplars and columns corresponding to features in the aligned query exemplars. Thus, the dictionary may have dimensionality of $Dl \times N_{c,l}$, where $Dl$ is the number of features in the longest of the query exemplars and $N_{c,l}$ is the number of aligned query exemplars.

Furthermore, in some examples, query processing system 202 may add one or more artificial noise exemplars to the dictionary (708). Thus, the entries in the dictionary may include the aligned query exemplars and the artificial noise exemplars. The number of bottleneck features generated by applying TFCNN 204 to each of the artificial noise exemplars is equal to the number of bottleneck features generated by applying TFCNN 204 to the longest query exemplar. In some examples, each of the artificial noise exemplars has only one non-zero feature dimension. In such examples, the non-zero feature dimension is at a different position in each of the different artificial noise exemplars. The features in each of the artificial noise exemplars may be randomly generated non-zero values. Thus, after adding the one or more artificial noise exemplars to the dictionary, the dictionary may have dimensionality of $Dl \times M_{c,l}$, where $M_{c,l}$ is the total number of aligned query exemplars and artificial noise exemplars. Inclusion of the artificial noise exemplars may help the merged query exemplar be more noise robust. That is, computation engine 102 may be better able to detect the merge query exemplar in noisy reference audio signals.

Query processing system 202 may then align a detected search segment of the one or more detected search segments with the longest query exemplar (710). Query processing system 202 may align the detected search segment with the longest query exemplar using sDTW as described elsewhere in this disclosure. Additionally, query processing system 202 may then initialize a set of weights for the detected search segment (712). The set of weights for the detected search segment may include a separate weight for each entry in the dictionary. In this disclosure, the set of weights may be denoted as the vector $x_{c,l}$, where the number of elements in $x_{c,l}$ is equal to $M_{c,l}$. Each of the weights is a non-negative value. In some examples, query processing system 202 may initialize each weight to the same value. For instance, query processing system 202 may initialize each weight to 1.

Next, query processing system 202 may generate a merged query exemplar based on the set of weights and the entries in the dictionary (714). For example, query processing system 202 may generate the merged query exemplar as:

$$\sum_{m=1}^{M_{c,l}} x_{c,l}^m a_{c,l}^m = A_{c,l} x_{c,l} \quad (11)$$

In equation (11), $a_{c,l}^m$ is the vector of features in the m'th entry of the dictionary and $x_{c,l}^m$ is the weight for the m'th entry of the dictionary.

Query processing system 202 may then update the set of weights (716). As shown in the example of FIG. 7, query processing system 202 may generate the merged query exemplar and update the weights multiple times, such that, ultimately, query processing system 202 may calculate a merged query exemplar $A_{c,l}x_{c,l}$ for the detected search segment such that the merged query exemplar is approximately the same as the detected search segment as shown in equation (12), below:

$$y_l \approx \sum_{m=1}^{M_{c,l}} x_{c,l}^m a_{c,l}^m = A_{c,l}x_{c,l} \quad \text{s.t.} \quad x_{c,l}^m \geq 0 \qquad (12)$$

In equation (12), $\alpha_{c,l}^m$ is the vector in the m'th entry in the dictionary. The number of features in $y_1$ is equal to the number of features in the longest of the query exemplars. Because $A_{c,l}x_{c,l}$ is approximately the same as the detected search segment, this disclosure may refer to $A_{c,l}x_{c,l}$ as the approximation of the detected search segment.

In some examples, query processing system 202 may update the set of weights by minimizing the cost function expressed in equation (13), below:

$$d(y_l, A_{c,l}x_{c,l}) + \sum_{m=1}^{M_{c,l}} x_{c,l}^m \Lambda_m \quad \text{s.t.} \quad x_{c,l}^m \geq 0 \qquad (13)$$

In equation (13), $\Lambda$ is a vector having $M_{c,l}$ entries. The first term of equation (13) is the divergence between the detected search segment and its approximation. The second term of equation (13) is a regularization term that penalizes the $l_1$-norm of the weight vector to produce a sparse solution. In this context, sparsity refers to the condition in which many of the weights are equal to 0. $\Lambda$ contains nonnegative values and controls how sparse the resulting vector x is. $\Lambda$ is a vector with two components, lambda_1 is the regularization factor for speech examples, lambda_2 is the regularization factor for noise examples. The larger either of those lambdas are, the more the L1 norm of the x vector of weights plays in the objective function to be minimized, compared to the other term (the divergence). L1 regularization is generally used because it encourages a sparse solution. For instance, if $\Lambda=0$, the cost is independent of the sum of all weights, which implies larger sums are not penalized compared to smaller sums. As $\Lambda$ values increase, each weight scaled with the corresponding lambda contributes to the cost. From equation (14), below, one can see that $\Lambda$ appears as an offset at the denominator and by increasing the value of this offset, the weights can be pushed towards zero implying higher sparsity. By defining $\Lambda$ as a vector, the amount of sparsity enforced on different types of exemplars can be adjusted. In this case, using a high sparsity factor for artificial noise exemplars may be required to avoid the artificial noise exemplars getting relatively high weights compared to the query exemplars that represent speech.

In some examples, query processing system 202 may apply non-negative sparse coding (NSC) to update the weights in a way that minimizes the cost function of equation (13). For the NSC solution of the weights, query processing system 202 may apply the multiplicative update rule given by equation (14), below:

$$x_{c,l} \leftarrow (x_{c,l} \odot ((A_{c,l}^T(y_l \oslash (A_{c,l}x_{c,l}))) \oslash (A_{c,l}^T 1 + \Lambda))) \qquad (14)$$

In equation (14), $\odot$ and $\oslash$ denote element-wise multiplication and element-wise division, respectively.

Query processing system 202 may then determine whether a termination criterion has been achieved (718). In different examples, query processing system 202 may use different termination criteria. In one example, query processing system 202 may determine that the termination criterion is achieved when query processing system 202 has performed actions (714) and (716) a particular number of times. In another example, query processing system 202 may determine that the termination criterion is achieved when the amount by which the weights change between updates of the weights is less than a threshold.

In response to determining that the termination criterion has not been achieved ("NO" branch of 718), query processing system 202 may generate the merged query exemplar again using the updated weights (714) and update the weights based on the merged query exemplar (716). Query processing system 202 may then determine again whether the termination criterion has been achieved (718). This process may continue to recur until the termination criterion has been achieved.

In response to determining that the termination criterion has been achieved ("YES" branch of 718), query processing system 202 may re-generate the merged query exemplar using the updated weights (720). Additionally, query processing system 202 may calculate a reconstruction error for the detected search segment (722). In this context, the reconstruction error quantifies the deviation between the approximation (dictionary*final weights) and the detected search segment. Smaller reconstruction errors indicate higher similarity between the exemplars in the dictionary and the detected search segment.

Query processing system 202 may calculate the reconstruction error in various ways, such as using Kullback-Liebler divergence or frame-level cosine distance. In this context, a frame is a feature frame, such as a 25-millisecond window length of speech. By iteratively applying the update rule of equation (14), the weight vector may become sparse, and reconstruction error between each aligned query exemplar and the merged query exemplar decreases monotonically. In some examples, query processing system 202 may normalize the reconstruction error for the detected search segment with the frame length. In other words, for each keyword, all exemplars are aligned to the longest exemplars as mentioned earlier. This implies that for each keyword, query processing system 202 uses exemplars of different frame length (duration). Therefore, query processing system 202 may eventually compare the reconstruction error per frame to normalize the effect of the exemplar length.

Query processing system 202 may then calculate a detection score for the detected search segment based on the reconstruction error for the detected search segment (724). Because higher reconstruction errors may correspond to lower correspondence between the merged query exemplar and the detected search segment, query processing system 202 may determine a normalized detection score, denoted as RS, based on the normalized reconstruction error as shown in equation (15), below:

$$RS = 1 - RE_{norm} + K \qquad (15)$$

In equation (15), $RE_{norm}$ is the normalized reconstruction error and K is a constant chosen to shift the $RE_{norm}$ to a range similar to detection scores obtained for the detected search segments in action (702). This may allow detection scores obtains for the detected search segments to be made comparable to the reconstruction scores calculated in equation (15). In some examples, RS may be considered a refined detection score.

In some examples, to determine the detection score for the detected search segment, query processing system 202 may obtain a final detection score FS for the detected search segment as a weighted sum of mDS and mRS for the detection, as shown in equation $$FS=mRS*RW+mDS*(1-RW) \qquad (16)$$

In equation (16), RW is a rescoring weight which lies in the range [0, 1]. Query processing system 202 may determine mRS by applying m-normalization to the RS values. In some examples, FS may be considered a refined detection score.

In this way, computation engine 102 may include a plurality of query exemplars as entries in a dictionary and align a detected search segment to a longest of the query exemplars. In the context of FIG. 5, a segment of the reference audio stream starting at a particular audio frame of the reference audio signal is a detected search segment. Additionally, computation engine 102 may, as described for example in actions (712) through (718) determine weights for the entries in the dictionary where the determined weights minimize a first reconstruction error. The first reconstruction error quantifies a deviation between the detected search segment and a weighted sum of the entries in the dictionary in which the entries in the dictionary are weighted according to the weights. Additionally, as set forth in action (720), computation engine 102 may generate a merged query exemplar based on the weighted sum of the entries in the dictionary weighted according to the weights. Computation engine 102 may calculate a second reconstruction error. The second reconstruction error quantifies a deviation between the merged query exemplar and the detected search segment. Computation engine 102 may then determine, based on the second reconstruction error, a detection score for the detected search segment.

Query processing system 202 may then determine whether there are any remaining detected search segments (726). If so ("YES" branch of 726), query processing system 202 may align another one of the detected search segments to the longest query exemplar (710) and repeat actions (712) through (724) for the other detected search segment. In response to determining that there are no remaining detected search segments ("NO" branch of 726), the operation of FIG. 7 may end.

As noted above, query processing system 202 may detect one or more search segments in action (702). In one example, to detect the one or more search segments, query processing system 202 may merge query exemplars together prior to DTW search into a single example and DTW module 404 of query processing system 202 may apply sDTW only using this merged example. This example may provide increased speed relative to the example of merging detections in a late-stage fashion. In this example, assume that there are N query exemplars for a particular query in no particular order. Query processing system 202 may then select two of the query exemplars (e.g., randomly) and align the selected query exemplars (e.g., using standard DTW). For instance, machine learning system 200 may generate a first query feature vector using the first selected query exemplar and a second query feature vector using the second selected query exemplar. Because the first query feature vector and the second query feature vector may each comprise the output values of bottleneck layer 306C (FIG. 3) and an activation function of neurons in bottleneck layer 306C may be a sigmoid activation function, the first query feature vector and the second query feature vector may be considered to contain sigmoid bottleneck features. Query processing system 202 may then determine an alignment path through a joint distribution matrix based on distances between features in the first query feature vector and the second query feature vector. Each cell in the joint distance matrix may be referred to herein as a "matrix frame."

Query processing system 202 may then generate a merged query feature vector. To generate the merged query feature vector, query processing system 202 may, for each matrix frame on the alignment path, determine an average of the sigmoid bottleneck features in the first query feature vector and the second query feature vector corresponding to the matrix frame, thereby generating a feature in the merged query feature vector. Query processing system 202 may merge a third query exemplar into the merged query feature vector in a similar way. Query processing system 202 may repeat this process until all available query exemplars for the query are merged into the merged query feature vector. Query processing system 202 may determine the alignment path using sDTW, with the memory efficient improvements described above in DTW Algorithm 2.

The length of the final merged query feature vector may be equal to the length of the query feature vector produced for the longest available query exemplar. That is, there may be different numbers of audio frames in different ones of the query exemplars. As discussed above, each of the audio frames correspond to a specific number of time bands. Hence, bottleneck layer 306C may generate a vector of output features for each audio frame of a query exemplar. Query processing system 202 may form the query feature vector by concatenating the vectors of output values generated for the audio frames of the query exemplar. Thus, the query feature vectors produced by query processing system 202 for different query exemplars may have different lengths. However, it is the case in this example that the final merged query feature vector has the same length as the query feature vector produced for the longest available query exemplar, where the longest available query exemplar is the available query exemplar that includes the most audio frames.

When using a single query exemplar, machine learning system 200 may generate a reference feature vector for a reference audio signal (i.e., a search utterance). Like a query exemplar, the reference audio signal may comprise one or more audio frames. Hence, like the query feature vector, query processing system 202 may produce the reference feature vector for the reference audio signal as a concatenation of vectors of output features generated by bottleneck layer 306C based on the one or more audio frames of the reference audio signal. Query processing system 202 may then generate a joint distance matrix based on the reference feature vector and the merged query feature vector. For ease of explanation, this disclosure assumes that the features of the merged query feature vector correspond to rows of the joint distance matrix and assumes that the features of the reference feature vector correspond to columns of the joint distance matrix.

Next, query processing system 202 may determine alignment paths through the joint distance matrix. Because an alignment path always starts at a matrix frame corresponding to the first-occurring feature of the merged query feature vector (e.g., a bottom row of the joint distance matrix) and ends at a matrix frame corresponding to the last-occurring feature of the merged query feature vector (e.g., a top row of the joint distance matrix), but may start at any column of the joint distance matrix, query processing system 202 may initialize a path distance to 0 at each column to enable the best paths to start at any column of the joint distance matrix. For each column of the joint distance matrix, query processing system 202 may progressively compute a minimum accumulated distance for a path through the joint distance matrix starting at the column. For each path, local path constraints require the path to move horizontally, vertically, or diagonally by one matrix frame at a time. Query processing system 202 may apply path normalization by total path length when making best-path decisions as well as at the end. That is, query processing system 202 is attempting to compare several different paths at each step to determine which path has the lowest "cost", where the cost is defined as the accumulated cost of each step, divided by the number of steps in the path. Two paths going from point A to point B can be shorter or longer since steps can be vertical, horizontal or diagonal, hence the need for normalization. The normalization accumulated distance is computed throughout the algorithm in order to make local decisions, as well as at the end in order to obtain the final detection score. At each step, query processing system 202 may store three values for a path: the starting frame, the current path length, and accumulated distance.

For each column of the joint distance matrix, query processing system 202 may determine whether a normalized accumulated distance of a path ending at the column is a local minimum relative to normalized accumulated distances of paths ending at neighboring columns. If the path ending at the column is a local minimum, this disclosure may refer to the column as a local minimum column. For each local minimum column, query processing system 202 may retrieve a stored starting matrix frame for the path ending at the local minimum column. In other words, query processing system 202 may retrieve data indicating the column at which the path starts. Query processing system 202 may then perform pairwise comparison of all detections for a particular query, which may enable merging the detections overlapping by more than a threshold level (e.g., 50%), by keeping the detection of least normalized distance. In other words, query processing system 202 may consider two or more paths to correspond to the same occurrence of the merged query exemplar if the paths overlap more at more than the threshold among along the normalized lengths of the paths.

For each of the detected paths, query processing system 202 may normalize the accumulated distance of the path. For instance, query processing system 202 may normalize the accumulated distance of the path to a range of [0, 1]. Because higher accumulated distance may correspond to lower confidence that the path corresponds to merged query exemplar, query processing system 202 may calculate a detection score (DS) for the path as:

$$DS=(1-D_{norm}) \tag{17}$$

In equation (17), $D_{norm}$ is the normalized accumulated distance for the path.

In some examples, distribution plots of the DS scores for each query are unimodal with variations in the means and variances depending on the query. In some examples, query processing system 202 may apply M-normalization to the detection scores (the m-normalized scores are henceforth referred to as mDS) to recalibrate detections from different queries. In this way, applying m-normalization to the detection scores may make the resulting normalized detection scores comparable across different queries, such as different queries for different keywords.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system for determining whether a reference audio signal contains a query, the computing system comprising:
    a computer-readable storage medium configured to:
        store samples of the reference audio signal, each of the samples of the reference audio signal corresponding to a different combination of a time band and a frequency band; and
        store data representing a time-frequency convolutional neural network (TFCNN), the TFCNN comprising:

a time convolutional layer that applies first filters to first input feature vectors, the first input feature vectors being sets of the samples that correspond to a same frequency band and different time bands;

a frequency convolutional layer that applies second filters to second input feature vectors, the second input feature vectors being sets of the samples that correspond to a same time band and different frequency bands; and a series of additional layers, wherein:
the series of additional layers includes an input layer, an output layer, and a series of hidden layers between the input layer and the output layer, input to the input layer comprises output of the time convolutional layer and output of the frequency convolutional layer, and the series of hidden layers includes a bottleneck layer that includes fewer neurons than a hidden layer that precedes the bottleneck layer in the series of hidden layers;

a computation engine that comprises circuitry configured to apply the TFCNN to samples of the query utterance at least through the bottleneck layer, the TFCNN is trained to discriminate phonetic classes, and wherein a query feature vector comprises output values of the bottleneck layer generated when the computation engine applies the TFCNN to the samples of the query utterance;

wherein the computation engine comprises circuitry configured to apply the TFCNN to the samples of the reference audio signal at least through the bottleneck layer, wherein a reference feature vector comprises output values of the bottleneck layer generated when the computation engine applies the TFCNN to the samples of the reference audio signal; and wherein the computation engine comprises circuitry configured to determine, based on the query feature vector and the reference feature vector, a detection score corresponding to a level of confidence that the reference audio signal contains the query utterance.

2. The computing system of claim 1, wherein the computation engine comprises circuitry configured to:
generate, based on the detection score, an indication that the reference audio signal contains the query utterance; and
output the indication.

3. The computing system of claim 1, wherein the circuitry of the computation engine configured to determine the detection score is configured to determine the detection score based on an accumulated distance of a path determined by applying dynamic time warping to the query feature vector and the reference feature vector.

4. The computing system of claim 3, wherein the circuitry of the computation engine configured to determine the detection score is configured to:
generate a joint distance matrix, wherein matrix frames in the joint distance matrix correspond to different combinations of features of the query feature vector and features of the reference feature vector, each of the matrix frames of the joint distance matrix contains a value indicating a distance between features in the combination corresponding to the matrix frame; and
determine a best path through the matrix frame of the joint distance matrix, wherein a total of distances indicated by the matrix frame along the best path is less than totals of distances indicated by matrix frames along other evaluated paths through the matrix frames of the joint distance matrix, wherein the detection score is based on the total of distances indicated by the cells along the best path.

5. The computing system of claim 1, wherein:
the TFCNN comprises a first max pooling layer, wherein inputs of the first max pooling layer are outputs of the time convolutional layer, the first max pooling layer groups the inputs into a first set of sub-regions, outputs of the first max pooling layer include a maximum input into each sub-region of the first set of sub-regions, and the outputs of the first max pooling layer are the inputs to the input layer of the series of additional layers, and the TFCNN comprises a second max pooling layer, wherein inputs of the second max pooling layer are outputs of the frequency convolutional layer, the second max pooling layer groups the inputs into a second set of sub-regions, outputs of the second max pooling layer include a maximum input into each of sub-region of the second set of sub-regions, and the outputs of the second max pooling layer are the inputs to the input layer of the series of additional layers.

6. The computing system of claim 1, wherein the query utterance is an in-domain keyword template, the reference audio signal is in a set of reference audio signals, the detection score corresponding to the level of confidence that the reference audio signal contains the query utterance is a Query by Example (QbE)-based detection score for the reference audio signal, and the computation engine further comprises circuitry configured to:
apply an Automatic Speech Recognition (ASR)-based keyword spotting process to the set of reference audio signals to determine ASR-based detection scores for the reference audio signals;
identify, based on the ASR-based detection scores for the reference audio signals, a set of top results among the set of reference audio signals;
determine similarity measures between the top results using dynamic time warping;
identify a subset of the top results based on the similarity measures;
combine reference audio signals in the subset of the top results into the in-domain keyword template; and
determine a final detection score for the reference audio signal based on the QbE-based detection score for the reference audio signal and the ASR-based detection score for the reference audio signal.

7. The computing system of claim 1, wherein a segment of the reference audio stream starting at the reference audio signal is a detected search segment, the computation engine further comprises circuitry configured to:
include a plurality of query exemplars as entries in a dictionary;
align the detected search segment to a longest of the query exemplars;
determine weights for the entries in the dictionary, wherein the determined weights minimize a first reconstruction error, the first reconstruction error quantifying a deviation between the detected search segment and a weighted sum of the entries in the dictionary in which the entries in the dictionary are weighted according to the weights;
generate a merged query exemplar based on the weighted sum of the entries in the dictionary;

calculate a second reconstruction error, wherein the second reconstruction error quantifies a deviation between the merged query exemplar and the detected search segment; and determine, based on the second reconstruction error, a detection score for the detected search segment.

8. A method for determining whether a reference audio signal contains a query, the method comprising:

storing samples of the reference audio signal, each of the samples of the reference audio signal corresponding to a different combination of a time band and a frequency band; and storing data representing a time-frequency convolutional neural network (TFCNN), the TFCNN comprising:

a time convolutional layer that applies first filters to first input feature vectors, the first input feature vectors being sets of the samples that correspond to a same frequency and different times;

a frequency convolutional layer that applies second filters to second input feature vectors, the second input feature vectors being sets of the samples that correspond to a same time and different frequencies; and a series of additional layers, wherein:

the series of additional layers including an input layer, an output layer, and a series of hidden layers between the input layer and the output layer, input to the input layer comprises output of the time convolutional layer and output of the frequency convolutional layer, the series of hidden layers includes a bottleneck layer that includes fewer neurons than a hidden layer that precedes the bottleneck layer in the series of hidden layers;

applying the TFCNN to samples of a query utterance at least through the bottleneck layer, wherein the TFCNN is trained to discriminate phonetic classes and a query feature vector comprises output values of the bottleneck layer generated when the computation engine applies the TFCNN to the samples of the query utterance, the query utterance being an example of an audio signal that contains the query;

applying the TFCNN to samples of the reference audio signal at least through the bottleneck layer, wherein a reference feature vector comprises output values of the bottleneck layer generated when the computation engine applies the TFCNN to the samples of the reference audio signal; and determining, based on the query feature vector and the reference feature vector, a detection score corresponding to a level of confidence that the reference audio signal contains the query.

9. The method of claim 8, further comprising:

generating, based on the detection score, an indication that the audio frame of the reference audio signal contains the query; and outputting the indication.

10. The method of claim 8, wherein:

determining the detection score comprises determining the detection score based on an accumulated distance of a path determined by applying dynamic time warping to the query feature vector and the reference feature vector.

11. The method of claim 10, wherein determining the detection score comprises:

generating a joint distance matrix, wherein matrix frames in the joint distance matrix correspond to different combinations of features of the query feature vector and features of the reference feature vector, each of the matrix frames of the joint distance matrix contains a value indicating a distance between features in the combination corresponding to the matrix frame; and determining a best path through the matrix frame of the joint distance matrix, wherein a total of distances indicated by the matrix frame along the best path is less than totals of distances indicated by matrix frames along other evaluated paths through the matrix frames of the joint distance matrix, wherein the detection score is based on the total of distances indicated by the cells along the best path.

12. The method of claim 8, wherein:

the TFCNN comprises a first max pooling layer, wherein inputs of the first max pooling layer are outputs of the time convolutional layer, the first max pooling layer groups the inputs into a first set of sub-regions, outputs of the first max pooling layer include a maximum input into each sub-region of the first set of sub-regions, and the outputs of the first max pooling layer are the inputs to the input layer of the series of additional layers, and the TFCNN comprises a second max pooling layer, wherein inputs of the second max pooling layer are outputs of the frequency convolutional layer, the second max pooling layer groups the inputs into a second set of sub-regions, outputs of the second max pooling layer include a maximum input into each of sub-region of the second set of sub-regions, and the outputs of the second max pooling layer are the inputs to the input layer of the series of additional layers.

13. The method of claim 8, wherein the query utterance is an in-domain keyword template, the reference audio signal is in a set of reference audio signals, the detection score corresponding to the level of confidence that the audio frame of the reference audio signal contains the query is a Query by Example (QbE)-based detection score for the reference audio signal, and the method further comprises:

applying an Automatic Speech Recognition (ASR)-based keyword spotting process to the set of reference audio signals to determine ASR-based detection scores for the reference audio signals;

identifying, based on the ASR-based detection scores for the reference audio signals, a set of top results among the set of reference audio signals;

determining similarity measures between the top results using dynamic time warping;

identifying a subset of the top results based on the similarity measures;

combining reference audio signals in the subset of the top results into the in-domain keyword template; and determining a final detection score for the reference audio signal based on the QbE-based detection score for the reference audio signal and the ASR-based detection score for the reference audio signal.

14. The method of claim 8, wherein a segment of the reference audio stream starting at the audio frame of the reference audio signal is a detected search segment, the method further comprising:

including a plurality of query exemplars as entries in a dictionary;

aligning the detected search segment to a longest of the query exemplars;

determining weights for the entries in the dictionary, wherein the determined weights minimize a first reconstruction error, the first reconstruction error quantifying a deviation between the detected search segment and a weighted sum of the entries in the dictionary in which the entries in the dictionary are weighted according to the weights;

generating a merged query exemplar based on the weighted sum of the entries in the dictionary;

calculating a second reconstruction error, wherein the second reconstruction error quantifies a deviation between the merged query exemplar and the detected search segment; and determining, based on the second reconstruction error, a detection score for the detected search segment.

15. A non-transitory computer-readable data storage medium having instructions stored thereon that, when executed, cause a computing system to:

store samples of the reference audio signal, each of the samples of the reference audio signal corresponding to a different combination of a time band and a frequency band; and store data representing a time-frequency convolutional neural network (TFCNN), the TFCNN comprising:
a time convolutional layer that applies first filters to first input feature vectors, the first input feature vectors being sets of the samples that correspond to a same frequency band and different time bands;
a frequency convolutional layer that applies second filters to second input feature vectors, the second input feature vectors being sets of the samples that correspond to a same time band and different frequency bands; and
a series of additional layers, wherein:
the series of additional layers including an input layer, an output layer, and a series of hidden layers between the input layer and the output layer,
input to the input layer comprises output of the time convolutional layer and output of the frequency convolutional layer,
the series of hidden layers includes a bottleneck layer that includes fewer neurons than a hidden layer that precedes the bottleneck layer in the series of hidden layers;

apply the TFCNN to samples of a query utterance at least through the bottleneck layer, wherein the TFCNN is trained to discriminate phonetic classes and a query feature vector comprises output values of the bottleneck layer generated when the computation engine applies the TFCNN to the samples of the query utterance, the query utterance being an example of an audio signal that contains the query;

apply the TFCNN to the samples of the reference audio signal at least through the bottleneck layer, wherein a reference feature vector comprises output values of the bottleneck layer generated when the computation engine applies the TFCNN to the samples of the reference audio signal; and determine, based on the query feature vector and the reference feature vector, a detection score corresponding to a level of confidence that the reference audio signal contains the query.

16. The non-transitory computer-readable data storage medium of claim 15, wherein execution of the instructions causes the computing system to:

generate, based on the detection score, an indication that the reference audio signal contains the query;

output the indication.

17. The non-transitory computer-readable data storage medium of claim 15, wherein execution of the instructions causes the computing system to determine the detection score based on an accumulated distance of a path determined by applying dynamic time warping to the query feature vector and the reference feature vector.

18. The non-transitory computer-readable data storage medium of claim 17, wherein execution of the instructions causes the computing system to:

generate a joint distance matrix, wherein matrix frames in the joint distance matrix correspond to different combinations of features of the query feature vector and features of the reference feature vector, each of the matrix frames of the joint distance matrix contains a value indicating a distance between features in the combination corresponding to the matrix frame; and determine a best path through the matrix frame of the joint distance matrix, wherein a total of distances indicated by the matrix frame along the best path is less than totals of distances indicated by matrix frames along other evaluated paths through the matrix frames of the joint distance matrix, wherein the detection score is based on the total of distances indicated by the cells along the best path.

19. The non-transitory computer-readable data storage medium of claim 15, wherein:

the TFCNN comprises a first max pooling layer, wherein inputs of the first max pooling layer are outputs of the time convolutional layer, the first max pooling layer groups the inputs into a first set of sub-regions, outputs of the first max pooling layer include a maximum input into each sub-region of the first set of sub-regions, and the outputs of the first max pooling layer are the inputs to the input layer of the series of additional layers, and the TFCNN comprises a second max pooling layer, wherein inputs of the second max pooling layer are outputs of the frequency convolutional layer, the second max pooling layer groups the inputs into a second set of sub-regions, outputs of the second max pooling layer include a maximum input into each of sub-region of the second set of sub-regions, and the outputs of the second max pooling layer are the inputs to the input layer of the series of additional layers.

20. The non-transitory computer-readable storage data storage medium of claim 15, wherein a segment of the reference audio stream is a detected search segment and execution of the instructions further causes the computing system to:

include a plurality of query exemplars as entries in a dictionary;

align the detected search segment to a longest of the query exemplars;

determine weights for the entries in the dictionary, wherein the determined weights minimize a first reconstruction error, the first reconstruction error quantifying a deviation between the detected search segment and a weighted sum of the entries in the dictionary in which the entries in the dictionary are weighted according to the weights;

generate a merged query exemplar based on the weighted sum of the entries in the dictionary;

calculate a second reconstruction error, wherein the second reconstruction error quantifies a deviation between the merged query exemplar and the detected search segment; and determine, based on the second reconstruction error, a detection score for the detected search segment.

* * * * *